United States Patent
Agnello et al.

(10) Patent No.: US 8,637,792 B2
(45) Date of Patent: Jan. 28, 2014

(54) CONVEYOR OVEN WITH ADJUSTABLE AIR VENTS

(75) Inventors: Frank Agnello, South Elgin, IL (US); Loren Veltrop, Chicago, IL (US); Thomas Serena, Palatine, IL (US); Nathaniel Howard, Plainfield, IL (US)

(73) Assignee: Prince Castle, LLC, Carol Stream, IL (US)

( * ) Notice: Subject to any disclaimer, the term of this patent is extended or adjusted under 35 U.S.C. 154(b) by 299 days.

(21) Appl. No.: 13/110,224

(22) Filed: May 18, 2011

(65) Prior Publication Data

US 2012/0294596 A1    Nov. 22, 2012

(51) Int. Cl.

| A21B 1/40 | (2006.01) |
|---|---|
| A21B 1/48 | (2006.01) |
| A21B 2/00 | (2006.01) |
| A21B 3/04 | (2006.01) |
| F27B 9/24 | (2006.01) |
| F27B 9/30 | (2006.01) |
| F27B 9/36 | (2006.01) |
| F27D 7/00 | (2006.01) |

(52) U.S. Cl.
USPC ........... 219/388; 219/400; 219/411; 392/416; 99/443 C

(58) Field of Classification Search
None
See application file for complete search history.

(56) References Cited

U.S. PATENT DOCUMENTS

| 387,811 A | 8/1888 | Radar |
|---|---|---|
| 392,162 A | 10/1888 | McDowell et al. |
| 398,729 A | 2/1889 | McDowell et al. |
| 636,973 A | 11/1899 | Galloway |
| 645,480 A | 3/1900 | Matthias |
| 745,025 A | 11/1903 | Porter |
| 1,240,757 A | 9/1917 | Mortland et al. |
| 1,342,045 A | 6/1920 | Hamwi |
| 1,344,285 A | 6/1920 | Wolf |
| 1,690,439 A | 4/1924 | Wigglesworth |
| 1,529,882 A | 3/1925 | Galbraith |
| 1,582,001 A | 4/1926 | Giammatteo |

(Continued)

FOREIGN PATENT DOCUMENTS

| CA | 1196510 | 11/1985 |
|---|---|---|
| DE | 19511683 A1 | 11/1995 |

(Continued)

OTHER PUBLICATIONS

Non-final Office Action, dated Jun. 28, 2010, U.S. Appl. No. 11/749,284, filed May 16, 2007.

(Continued)

*Primary Examiner* — Joseph M Pelham
(74) *Attorney, Agent, or Firm* — Kelly & Krause, LP; Joseph P. Krause

(57) ABSTRACT

A conveyor oven has several heating zones. Each heating zone is comprised of one or more infrared emitters that are configured to emit a spectrum of infrared wavelengths that varies in intensity and spectrum over time. The spectra of emitted infrared wavelengths in each zone can have the same or different profile. Zones are regions wherein infrared emitters are configured and operated to emit the same or substantially the same infrared energy wavelengths and intensity levels across an IR spectrum. Access to the infrared emitters and the conveyor is provided by one or more access or maintenance ports formed into a side of the conveyor oven. Temperature control inside the oven is effectuated by venting hot air through air vents formed into the oven sides and/or top.

15 Claims, 13 Drawing Sheets

(56) References Cited

U.S. PATENT DOCUMENTS

| | | |
|---|---|---|
| 1,620,120 A | 3/1927 | Morshead et al. |
| 1,968,395 A | 7/1934 | Henson |
| 2,336,816 A | 12/1943 | Thompson |
| 2,473,402 A | 6/1948 | Wood |
| 2,655,991 A | 11/1948 | Kennedy |
| 2,465,611 A | 3/1949 | Singer |
| 2,511,380 A | 6/1950 | Stadler |
| 2,517,360 A | 8/1950 | Singer |
| 2,535,393 A | 12/1950 | Daugert |
| 2,537,378 A | 1/1951 | Staltare |
| 2,631,216 A | 3/1953 | Ames |
| 2,678,372 A | 5/1954 | Salton |
| 2,718,188 A | 9/1955 | Read et al. |
| 2,745,363 A | 5/1956 | Balton |
| 3,009,410 A | 11/1959 | Murphy |
| 3,008,513 A | 11/1961 | Holden |
| 3,019,720 A | 2/1962 | Topper |
| 3,084,736 A | 4/1963 | Mentel et al. |
| 3,087,418 A | 4/1963 | Albright |
| 3,129,749 A | 4/1964 | Honger |
| 3,152,535 A | 10/1964 | Pollak, Jr. et al. |
| 3,188,366 A | 6/1965 | Flynn |
| 3,199,573 A | 8/1965 | Flynn |
| 3,200,874 A | 8/1965 | Koppel |
| 3,249,741 A | 5/1966 | Mills |
| 3,262,383 A | 7/1966 | Sturman |
| 3,330,267 A | 7/1967 | Bauer |
| 3,366,156 A | 1/1968 | Belknap |
| 3,384,497 A | 5/1968 | Gassmann |
| 3,391,983 A | 7/1968 | Harazono et al. |
| 3,439,996 A | 4/1969 | Lherault et al. |
| 3,471,682 A | 10/1969 | Hisey et al. |
| 3,529,916 A | 9/1970 | Krieger |
| 3,547,097 A | 12/1970 | Rice |
| 3,556,707 A | 1/1971 | Hine, Jr. |
| 3,721,178 A | 3/1973 | Szabrak et al. |
| 3,744,403 A | 7/1973 | Castronuovo |
| 3,847,536 A | 11/1974 | Lepage |
| 3,852,025 A | 12/1974 | Placek |
| 3,870,459 A | 3/1975 | Desty et al. |
| 3,917,445 A | 11/1975 | Suva et al. |
| 3,958,552 A * | 5/1976 | Lawler .................. 126/247 |
| 4,140,100 A | 2/1979 | Ishihara |
| 4,245,613 A | 1/1981 | Wells et al. |
| 4,269,590 A | 5/1981 | Baumanns |
| 4,273,950 A | 6/1981 | Chitre |
| 4,286,509 A | 9/1981 | Miller et al. |
| 4,300,443 A | 11/1981 | Morcos et al. |
| 4,313,964 A | 2/1982 | Dembecki |
| 4,364,726 A | 12/1982 | Förster et al. |
| 4,370,126 A | 1/1983 | Miyanaka et al. |
| 4,389,562 A | 6/1983 | Chaudoir |
| 4,421,015 A | 12/1983 | Masters et al. |
| 4,437,833 A | 3/1984 | Mertz |
| 4,444,175 A * | 4/1984 | Reynolds .................. 126/21 R |
| 4,470,369 A | 9/1984 | Edgerton |
| 4,471,750 A | 9/1984 | Burtea |
| 4,501,072 A | 2/1985 | Jacobi, et al. |
| 4,508,502 A | 4/1985 | Itoh |
| 4,530,276 A | 7/1985 | Miller |
| 4,547,148 A | 10/1985 | Holmer |
| 4,554,437 A | 11/1985 | Wagner et al. |
| 4,557,203 A | 12/1985 | Mainord |
| 4,565,917 A | 1/1986 | Furtek |
| 4,569,657 A | 2/1986 | Laspeyres |
| 4,576,090 A | 3/1986 | Burtea |
| 4,591,333 A | 5/1986 | Henke |
| 4,597,734 A | 7/1986 | McCausland et al. |
| 4,599,066 A | 7/1986 | Granberg |
| 4,664,923 A | 5/1987 | Wagner et al. |
| 4,679,543 A | 7/1987 | Waltman et al. |
| 4,727,854 A | 3/1988 | Johnson |
| 4,739,154 A | 4/1988 | Bharara et al. |
| 4,782,814 A | 11/1988 | Cherryholmes |
| 4,798,192 A | 1/1989 | Maruko |
| 4,805,588 A | 2/1989 | Reynolds |
| 4,810,587 A | 3/1989 | Losfeld et al. |
| 4,817,513 A | 4/1989 | Carbon et al. |
| 4,881,519 A | 11/1989 | Henke |
| 4,900,245 A | 2/1990 | Ahmady |
| 4,927,355 A | 5/1990 | Haire et al. |
| 4,936,286 A | 6/1990 | Baker |
| 4,951,648 A | 8/1990 | Shukla et al. |
| 4,976,609 A | 12/1990 | Grob et al. |
| 5,006,355 A | 4/1991 | Stuck et al. |
| 5,086,694 A | 2/1992 | Stuck et al. |
| 5,154,160 A | 10/1992 | Burtea et al. |
| 5,173,320 A | 12/1992 | Stuck et al. |
| 5,174,744 A | 12/1992 | Singh |
| 5,176,068 A | 1/1993 | Stuck et al. |
| 5,197,375 A | 3/1993 | Rosenbrock et al. |
| 5,240,411 A | 8/1993 | Abalos |
| 5,240,653 A | 8/1993 | Ramkissoon |
| 5,253,564 A | 10/1993 | Rosenbrock et al. |
| 5,257,926 A | 11/1993 | Drimer et al. |
| 5,296,683 A | 3/1994 | Burkett et al. |
| 5,380,192 A | 1/1995 | Hamos |
| 5,439,372 A | 8/1995 | Duret et al. |
| 5,441,035 A | 8/1995 | Liang-Chieh |
| 5,511,974 A | 4/1996 | Gordon et al. |
| 5,520,536 A | 5/1996 | Rodgers et al. |
| 5,535,733 A | 7/1996 | Hait |
| 5,571,009 A | 11/1996 | Stlahane et al. |
| 5,586,877 A | 12/1996 | Charmes |
| 5,607,609 A | 3/1997 | Sakuyama et al. |
| 5,651,554 A | 7/1997 | Townsend |
| 5,665,257 A | 9/1997 | Svendsen |
| 5,676,870 A | 10/1997 | Wassman et al. |
| 5,686,004 A | 11/1997 | Schneider |
| 5,688,466 A | 11/1997 | Mitchell et al. |
| 5,694,835 A * | 12/1997 | Mangina .................. 99/468 |
| 5,770,835 A | 6/1998 | Sakuyama et al. |
| 5,820,361 A | 10/1998 | Lavigne et al. |
| 5,821,503 A | 10/1998 | Witt |
| 5,883,362 A | 3/1999 | Pettibone et al. |
| 5,906,485 A | 5/1999 | Groff et al. |
| 5,954,980 A | 9/1999 | Westerberg et al. |
| 5,960,704 A | 10/1999 | March et al. |
| 5,989,013 A | 11/1999 | Gray |
| 5,990,454 A | 11/1999 | Westerberg et al. |
| 6,005,223 A | 12/1999 | Ogihara |
| 6,030,206 A | 2/2000 | Shizukuisha et al. |
| 6,062,728 A | 5/2000 | Breunsbach et al. |
| 6,065,962 A | 5/2000 | Shizukuisha et al. |
| 6,069,345 A | 5/2000 | Westerberg |
| 6,071,113 A | 6/2000 | Tsubouchi et al. |
| 6,095,800 A | 8/2000 | Shizukuisha et al. |
| 6,146,678 A | 11/2000 | Caridis et al. |
| 6,192,789 B1 | 2/2001 | Agcaoili et al. |
| 6,193,932 B1 | 2/2001 | Wu et al. |
| 6,199,364 B1 | 3/2001 | Kendall et al. |
| 6,262,396 B1 | 7/2001 | Witt et al. |
| 6,323,462 B1 | 11/2001 | Strand |
| 6,330,791 B1 | 12/2001 | Kendall et al. |
| 6,365,210 B1 | 4/2002 | Schaible, II et al. |
| 6,369,360 B1 | 4/2002 | Cook |
| 6,375,351 B1 | 4/2002 | Breunsbach et al. |
| 6,435,861 B1 | 8/2002 | Quick et al. |
| 6,511,223 B1 | 1/2003 | Austen et al. |
| 6,520,675 B1 | 2/2003 | Breunsbach et al. |
| 6,523,462 B1 | 2/2003 | Johnson et al. |
| 6,533,577 B2 | 3/2003 | Anderson et al. |
| 6,659,765 B1 | 12/2003 | Sen-Yu |
| 6,672,302 B1 | 1/2004 | Voorhis et al. |
| 6,684,875 B1 | 2/2004 | Schjerven, et al. |
| 6,707,014 B1 | 3/2004 | Corey et al. |
| 6,799,712 B1 | 10/2004 | Austen et al. |
| 6,867,392 B1 | 3/2005 | Howard |
| 6,867,399 B2 | 3/2005 | Muegge et al. |
| 6,872,072 B2 | 3/2005 | Kieswetter |
| 6,872,926 B1 | 3/2005 | Arntz et al. |
| 6,896,512 B2 | 5/2005 | Rattner et al. |
| 6,964,170 B2 | 11/2005 | Alkabie |
| 6,993,927 B2 | 2/2006 | Austen et al. |

(56) References Cited

U.S. PATENT DOCUMENTS

| | | |
|---|---|---|
| 7,013,080 B1 | 3/2006 | Kaplanis et al. |
| 7,026,579 B2 | 4/2006 | Burtea |
| 7,038,172 B1 | 5/2006 | Stuck |
| 7,091,452 B2 | 8/2006 | Kingdon et al. |
| 7,201,572 B2 | 4/2007 | Wood et al. |
| 7,202,447 B2 | 4/2007 | Kingdon et al. |
| 7,235,762 B2 * | 6/2007 | Gagas et al. ............ 219/400 |
| 7,279,659 B2 * | 10/2007 | Gagas et al. ............ 219/400 |
| 7,297,903 B1 | 11/2007 | March et al. |
| 7,307,243 B2 | 12/2007 | Farkas et al. |
| 7,340,992 B1 | 3/2008 | Wolfe et al. |
| 7,381,927 B1 | 6/2008 | Agnello |
| 7,390,991 B1 | 6/2008 | Agnello |
| 7,432,483 B2 * | 10/2008 | Wilson ............ 219/700 |
| 7,488,919 B2 * | 2/2009 | Gagas et al. ............ 219/400 |
| 7,653,502 B2 | 1/2010 | Breunsbach |
| 7,678,400 B2 | 3/2010 | Agnello |
| 7,683,292 B2 | 3/2010 | Cavada et al. |
| 7,717,704 B2 | 5/2010 | Burtea et al. |
| 7,800,023 B2 | 9/2010 | Burtea et al. |
| 7,851,727 B2 | 12/2010 | Burtea et al. |
| 7,887,321 B2 | 2/2011 | Burtea et al. |
| 8,058,588 B2 * | 11/2011 | Gagas et al. ............ 219/400 |
| 8,075,304 B2 * | 12/2011 | Cox et al. ............ 431/90 |
| 8,367,978 B2 * | 2/2013 | Williams ............ 219/388 |
| 2001/0039884 A1 * | 11/2001 | Backus et al. ............ 99/421 H |
| 2002/0000290 A1 | 1/2002 | Crump et al. |
| 2002/0132205 A1 | 9/2002 | Gore et al. |
| 2002/0146658 A1 | 10/2002 | Ibrahim et al. |
| 2003/0015518 A1 | 1/2003 | Baker et al. |
| 2003/0213485 A1 | 11/2003 | Kieswetter |
| 2004/0170936 A1 | 9/2004 | Weclas et al. |
| 2004/0244535 A1 | 12/2004 | Austin |
| 2005/0136368 A1 | 6/2005 | Malloy et al. |
| 2005/0160544 A1 | 7/2005 | Geller |
| 2005/0173400 A1 | 8/2005 | Cavada et al. |
| 2005/0205547 A1 | 9/2005 | Wenzel |
| 2005/0274372 A1 | 12/2005 | Knight |
| 2006/0003277 A1 | 1/2006 | Jeng |
| 2006/0003279 A1 | 1/2006 | Best |
| 2006/0040224 A1 | 2/2006 | Lovato et al. |
| 2006/0040228 A1 | 2/2006 | Kim et al. |
| 2006/0081591 A1 | 4/2006 | Kingdon et al. |
| 2006/0115778 A1 | 6/2006 | Camargo |
| 2006/0154191 A1 | 7/2006 | Gilioli et al. |
| 2006/0225770 A1 | 10/2006 | Nowack |
| 2007/0023413 A1 * | 2/2007 | Wilson ............ 219/388 |
| 2007/0084457 A1 | 4/2007 | Wiedemann |
| 2007/0298361 A1 | 12/2007 | Fogliani et al. |
| 2008/0105252 A1 | 5/2008 | Barbour et al. |
| 2008/0110445 A1 | 5/2008 | Truijens |
| 2008/0124666 A1 | 5/2008 | Stocker et al. |
| 2008/0149615 A1 | 6/2008 | Agnello |
| 2008/0149616 A1 | 6/2008 | Agnello |
| 2008/0149617 A1 | 6/2008 | Agnello |
| 2008/0171122 A1 | 7/2008 | Agnello |
| 2008/0236564 A1 | 10/2008 | Burtea et al. |
| 2008/0241776 A1 | 10/2008 | Burtea et al. |
| 2008/0264406 A1 | 10/2008 | Burtea et al. |
| 2008/0283041 A1 | 11/2008 | Burtea et al. |
| 2009/0032012 A1 | 2/2009 | von Herrmann et al. |
| 2009/0034944 A1 | 2/2009 | Burtea et al. |
| 2009/0075224 A1 | 3/2009 | Wiker et al. |
| 2010/0116150 A1 | 5/2010 | Flock et al. |
| 2010/0127312 A1 | 5/2010 | Grebel et al. |
| 2010/0190123 A1 | 7/2010 | Burtea et al. |
| 2010/0267188 A1 * | 10/2010 | Parks et al. ............ 438/87 |

FOREIGN PATENT DOCUMENTS

| | | |
|---|---|---|
| JP | 05835314 | 3/1983 |
| JP | 08285238 | 11/1996 |
| WO | 2010080160 | 7/2010 |

OTHER PUBLICATIONS

Final Office Action, dated Aug. 4, 2009, U.S. Appl. No. 11/692,465, filed Mar. 28, 2007.

Non-final Office Action, dated Sep. 23, 2010, U.S. Appl. No. 11/830,411, filed Jul. 30, 2002.

Office Action, dated Mar. 8, 2010, U.S. Appl. No. 11/749,284, filed May 16, 2007.

Final Office Action, dated Oct. 16, 2009, U.S. Appl. No. 11/692,424, filed Mar. 28, 2007.

*Ex Parte Quayle* Action, dated Oct. 28, 2010, U.S. Appl. No. 12/754,287, filed Apr. 5, 2010.

Office Action, dated Jun. 22, 2009, U.S. Appl. No. 11/749,284, filed May 16, 2007.

Final Office Action, dated May 18, 2005, U.S. Appl. No. 10/833,796, filed Apr. 28, 2004.

Office Action, dated Aug. 3, 2005, U.S. Appl. No. 10/833,796, filed Apr. 28, 2004.

Office Action, dated Jan. 11, 2008, U.S. Appl. No. 11/590,091, filed Oct. 31, 2006.

Office Action, dated Jan. 9, 2008, U.S. Appl. No. 11/590,090, filed Oct. 31, 2006.

Office Action, dated Jun. 22, 2009, U.S. Appl. No. 11/739,177, filed Apr. 24, 2007.

Office Action, dated May 24, 2010, U.S. Appl. No. 11/739,177, filed Apr. 24, 2007.

Office Action, dated Jun. 11, 2010, U.S. Appl. No. 11/739,177, filed Apr. 24, 2001.

Non final Office Action, dated Jan. 22, 2009, U.S. Appl. No. 11/692,465, filed Mar. 28, 2007.

Non final Office Action, dated Mar. 27, 2009, U.S. Appl. No. 11/692,424, filed Mar. 28, 2007.

Non final Office Action, dated Nov. 16, 2004, U.S. Appl. No. 10/833,796, filed Apr. 28, 2004.

USPTO Office Action dated Jun. 24, 2013 for US Appl. No. 13/110,171, filed May 18, 2011, Confirmation No. 2966.

Fundamentals of Heat and Mass Transfer, 6th Edition, by Frank P. Incropera et al., copyright 2007 by John Wiley and Sons, Inc., pp. 753-809.

* cited by examiner

Spectral blackbody emissive power

CONVEYOR OVEN WITH ADJUSTABLE AIR VENTS

BACKGROUND

Multi-zone conveyor ovens are well-known. Such ovens are typically comprised of an elongated housing or cabinet having openings at each end. The housing defines a tunnel. A conveyor extends through the housing between the two ends.

A first type of conveyor oven heats items on the conveyor using infrared. In such an oven, one or more infrared-emitting heaters mounted above the conveyor, below the conveyor or both, irradiate items on the conveyor. Interior sidewalls of the housing or tunnel can themselves also emit infrared energy. A second type of conveyor oven heats items on the conveyor using forced hot air and/or convection.

DETAILED DESCRIPTION

Figure 1:
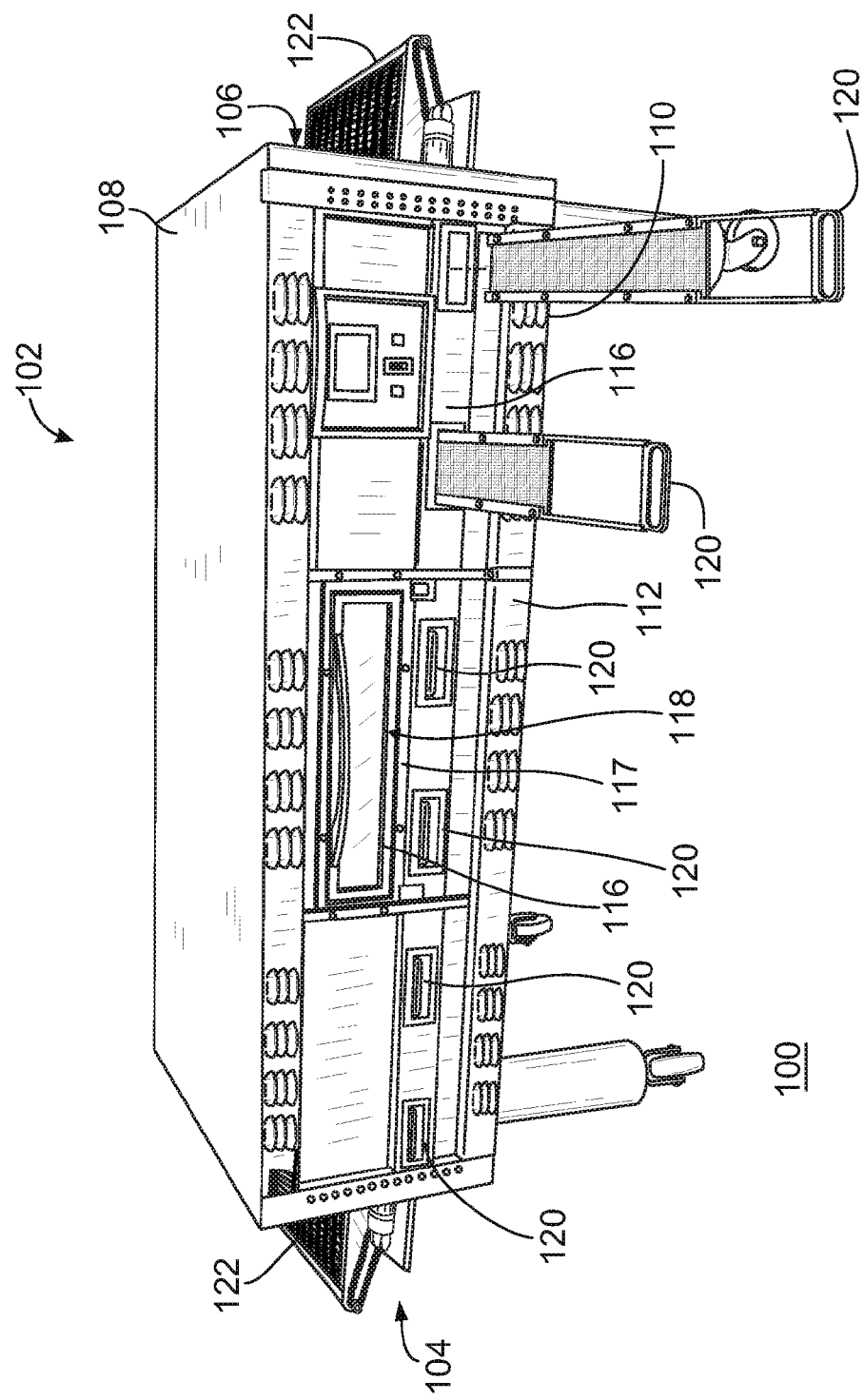
FIG. 1 is a perspective view of a multi-zone conveyor oven.

FIG. 1 is a perspective view of a multi-zone conveyor oven 100. The oven 100 is comprised of a chassis or cabinet 102. The cabinet 102 is comprised of a left end or side 104 and an opposing right end or side 106, a top 108 and an opposing bottom 110, which is not visible in the figure. A front side 112 has an opposing backside, which is also not visible in the figure, but nevertheless attached to the left side 104, right side 106, top 108 and bottom 110. The front side 112 and its opposing back side are attached to the left and right ends as well the top 108 and the bottom 110 to make the cabinet 102 essentially rigid.

The front side 112 has an access door 116 attached to the front side 112 by a hinge 118, which is also attached to a bottom or lower edge of the door 116. The access door 116 is comprised of a handle and a tempered glass window.

Six (6) doors or ports 120 are formed into the front side 112. The ports 120 are referred to hereinafter as maintenance ports 120 since they allow maintenance and repairs to be made to components located inside the oven 100, without having to disassemble the oven in whole or in part. The maintenance ports 120 are located at elevations in the side that allows access to the conveyor, burners and other components inside the cabinet 102, access to which would otherwise require removal of the conveyor or disassembly of the cabinet 102. Components inside the cabinet 102, including burner screens, can thus be removed from and replaced through the maintenance ports 120.

A preferred embodiment of the oven 100 has gas-fired, infrared-emitting burners 200 below a conveyor 122 that extends through the cabinet 102. The conveyor 122 extends outwardly from the left side 104 and the right side 106. The maintenance ports 120 are located on the front side 112 so that they provide access to at least the top of corresponding gas-fired burners, which are located inside the cabinet 102 and just below the conveyor 122.

The conveyor 122 carries food or other items through the oven 100 wherein food or other items on the conveyor 122 are irradiated with infrared energy. As items on the conveyor pass through the oven 100 from one side (104 or 106) to the other (106 or 104), infrared (IR) energy of varying wavelengths is applied to items on the conveyor 122. The IR varies in wavelength and intensity to effectuate different heating processes along the conveyor's path. The heating processes can be changed both qualitatively and quantitatively by changing the IR along the conveyor's path.

Figure 2:
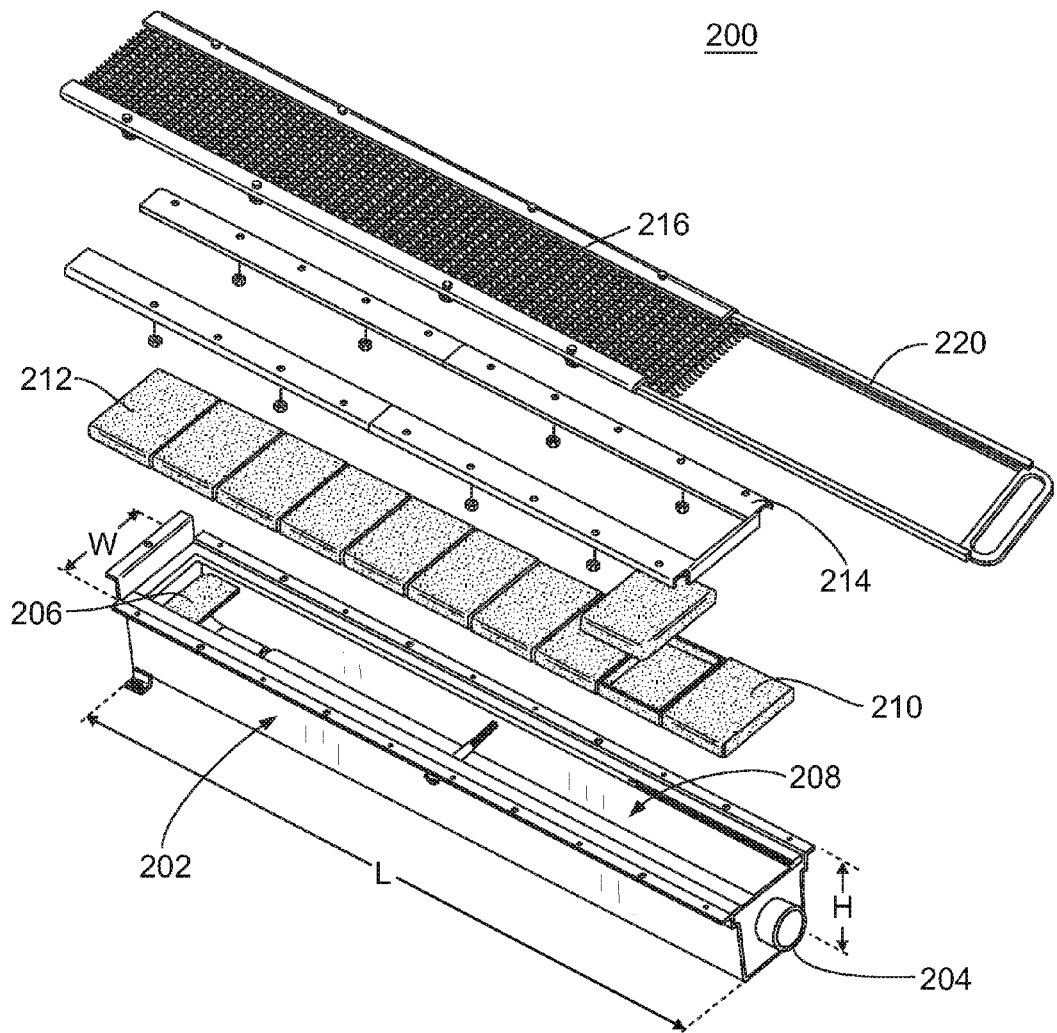
FIG. 2 is an exploded view of an infrared-emitting gas burner.

FIG. 2 is an exploded view of one infrared-emitting gas burner 200 used in the oven 100 shown in FIG. 1. The gas burner 200 is also disclosed in U.S. Pat. No. 7,800,023, which is entitled, "Conveyor Oven with Hybrid Heating Sources, issued Sep. 21, 2010, and which is assigned to the assignee of this application. The content of U.S. Pat. No. 7,800,023 is thus incorporated herein by reference in its entirety.

The gas burner 200 is comprised of a box-like, fuel distribution chamber 202 having a length L, a width W, a height H and an open top 208. A gaseous fuel and combustion air mixture is introduced into the chamber 202 through a fuel inlet pipe 204. A U-shaped diverter 206 at the opposite end of the chamber 202 re-directs the gas/air mixture back toward the fuel inlet pipe 204.

The open top 208 of the fuel distribution chamber 202 is covered by several separate individual wire mesh burner plates 210. The wire mesh burner plates 210 are disclosed in U.S. Pat. No. 7,717,704 entitled, "Wire Mesh Burner Plate for a Gas Oven Burner," issued May 18, 2010, which is assigned to the assignee of this application. The content of U.S. Pat. No. 7,717,704 is thus also incorporated herein by reference in its entirety.

Fuel and air flowing upwardly through the burner plates 210 is ignited by a gas pilot flame (not shown). The gas pilot flame is lit by an electric igniter controlled by a controller or computer also not shown. Several individual wire mesh burner plates 210 are assembled to provide an assembly 212 of burner plates 210 for the gas burner 200. An assembly 212 of burner plates 210 is described in U.S. Pat. No. 7,887,321 entitled "Burner Plate Assembly for a Gas Oven," issued Feb. 15, 2011, which is also assigned to the assignee of this application. The content of U.S. Pat. No. 7,887,321 is thus also incorporated herein by reference in its entirety.

Metal plates form a gasket 214 over the individual wire mesh burner plates 210, which holds the burner plates 210 and their assembly 212 in the open-top fuel distribution chamber 202. The gasket 214 also helps to stop unburned gaseous fuel and/or a gaseous fuel/air mixture from leaking out of the burner 200.

Fuel that passes through the burner plates 210 combusts in a space immediately above the burner plates 210 but below a wire mesh burner screen 216, as described in U.S. Pat. No. 7,851,727 entitled "Method of Controlling an Oven with Hybrid Heating Sources." U.S. Pat. No. 7,851,727 is assigned to the assignee of this application and its content is thus incorporated herein in its entirety. The wire mesh burner screen 216 is considered to be one embodiment of an infrared emitter.

The gas burner 200 and its included wire mesh burner screen 216, which is hereafter referred to interchangeably as a screen and burner screen, are located below the conveyor 122. Material that falls through the conveyor 122 onto the burner screen 216 can cause a "cold" spot to form on the burner screen 216 causing the infrared from the screen to be non-uniform. The burner screen 216 is therefore removable from the oven 100 via a maintenance port 120 formed into at least one side of the oven 100. Unlike prior art conveyor ovens, which do not provide direct access to their interiors without removing the conveyor, enabling the burner screen 216 to be removable through a maintenance port 120 facilitates cleaning and/or replacement of a burner screen 216, even while the oven 100 is in operation. The ability to access the conveyor 122 through a maintenance port 120 as well as remove a burner screen 216 via a maintenance port 120 thus facilitates operation of a conveyor oven. The conveyor oven thus has removable burner screens 216.

The wire mesh burner screen 216 structure is effectively low mass due to the nature of the mesh construction. The burner screen 216 is made up of wires that are formed from a low-mass, heat-tolerant material such as Nichrome wire, which is attached to an elongated handle 220 that is long enough to extend out through the maintenance port 120. Nichrome is used for an alloy of nickel, chromium, and iron. The elongated handle also facilitates heat dissipation from the user-end of the handle, enabling the burner screen 216 to be removed even while the oven is in operation.

Unlike solid plates used in some prior art ovens, which are heavy, slow to heat and slow to cool, the burner screen 216 is able to quickly respond to changes in its thermal environment and for reasons described below, quickly change the infrared wavelengths and intensity levels that it emits. Another important characteristic is its ability to deform or flex in response to applied forces as well as temperature-induced expansion and contraction. The burner screen 216 is also inherently lighter than a solid plate of the same material from which its wire mesh is made.

Thermal properties of matter are described in *Fundamentals of Heat and Mass Transfer*, by Frank P. Incropera et al., copyright 2007 by John Wiley and Sons, Inc., which is referred to hereinafter as Incropera et al. Pages 60-68 of Incropera et al., are incorporated herein by reference.

According to Incropera et al., thermal diffusivity is the ratio of a material's thermal conductivity to its heat capacity. Thermal diffusivity is expressed as a in the equation below, and is measured in units of $m^2/s$.

$$\alpha = \frac{k}{\rho c_p}$$

Where k is the thermal conductivity of the material, $\rho$ is its density and $c_p$ is specific heat.

The product of $\rho$ and $c_p$ is commonly known as volumetric heat capacity. According to Incropera et al., materials with large $\alpha$ values will fluctuate temperature quickly with changes in their thermal environment. Materials with small $\alpha$ values will respond more sluggishly, taking more time to reach a thermal or temperature equilibrium with their environment.

High-density materials are generally good thermal energy storage media and have large-valued volumetric heat capacities ($\rho c_p$). Low density materials on the other hand have smaller-valued volumetric heat capacities ($\rho c_p$). While the value of $\alpha$ for Nichrome itself is quite low, (about 3.4 $m^2/s$) and comparable to the $\alpha$ for stainless steels (3.7-4.0 $m^2/s$), which suggests that such materials would be a poor choice for a heated infrared emitter. Nichrome is used, because it is considered to be heat-tolerant. In addition to being resistant to high-temperatures, it is also resistant to corrosion and oxidation.

The screen 216 is not a solid block or plate of Nichrome or other material but is instead a screen or mesh formed from Nichrome. As used herein, the terms "screen" and "mesh" include a thin perforated plate or a meshed wire as well as a knotted or woven material having an open texture with evenly or substantially evenly spaced holes. The screen 216 can thus also be a interlocking or crisscross wires and equivalents thereof. The screen 216 can also be formed of a perforated ceramic plate or block.

The density of the burner screen, which is considered herein to be the mass of the screen divided by a volume of space just large enough to enclose the screen 216. The mass of the screen 216 is therefore low relative to the density of a flat solid or hollow plate of similar size and shape. By way of example, a screen 216 that measures two inches by four inches, and which has an area of eight square inches and which is one-eighth inch thick, will fit within a rectangular parallelepiped-shaped volume having a two-inch length, a four-inch width and a one-eighth inch height. The volume of such a parallelepiped and the screen it encloses would therefore be one cubic inch. Submerging the same screen in water however would displace less than one cubic inch. The value of $\alpha$ for the wire mesh burner screen is thus lower than the value of $\alpha$ for a plate of solid Nichrome. The thermal emissivity of a burner screen of a given area and nominal thickness will thus be greater than the thermal emissivity of a solid plate of the same material having the same area and the same nominal thickness.

As used herein, the term Nichrome refers to a metal alloy containing at least nickel and chromium. Nichrome is typically comprised of between approximately 20% and 90% nickel and 10% and 30% chromium. Other elements may be added to the alloy to achieve desired material properties.

Regardless of the material it is made from, a wire mesh burner screen is more quickly able to fluctuate temperature in response to changes in its thermal environment than is a solid burner plate, such as a solid plate of steel used in some prior art conveyor ovens. The temperature of the wire mesh can change much faster and, as described below change its emitted IR spectra accordingly.

The Nichrome wire or other heat-tolerant material is heated by the combustion of the gas/air fuel mixture after the burning fuel/air mixture passes through the wire mesh burner plates 210. Since the burner screen 216 is effectively of a low mass and has a large thermal diffusivity value, its temperature rises quickly to a temperature at which it will emit infrared wavelengths and energy levels that are useful for cooking/heating food items. The temperature that the burner screen 216 reaches and the wavelengths of the infrared it emits are determined primarily by the mass of the wire as well as the time that gaseous fuel is burning, i.e., the time that the gaseous fuel is provided to the gas burner. Stated another way, and as described in the patent identified above, the thermal energy emitted from the gas-fired burners 200 is controlled by cycling a gas supply on and off by opening and closing an electrically-operated gas valve and igniting the gas supply when it is on. Infrared energy that is emitted from other types of IR emitters that use electrically resistive elements, lasers, quartz halogen heaters, or inductive heating control their emitted infrared spectra essentially the same way.

Figure 11:
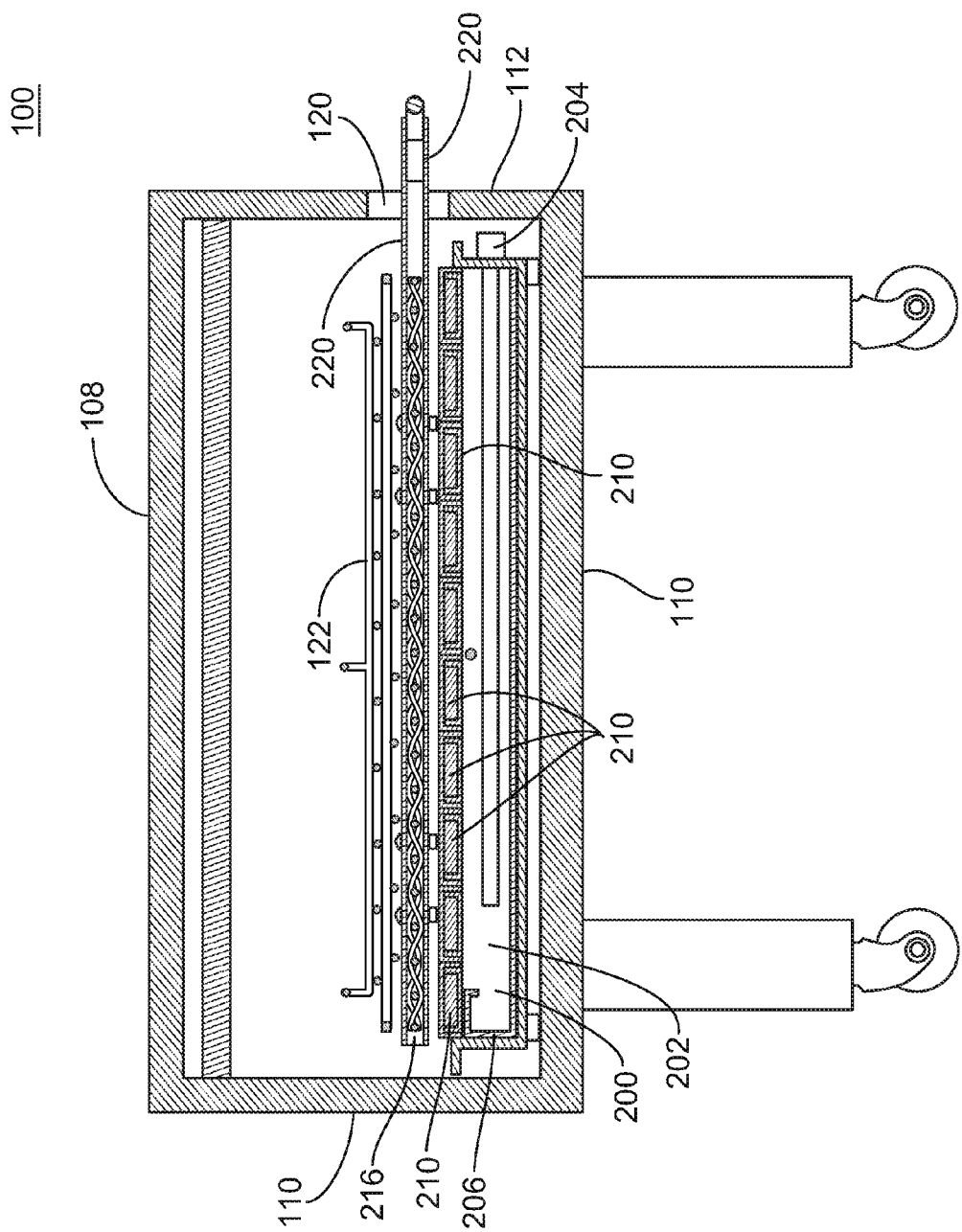
FIG. 11 is a cross-sectional view of the oven taken through one of the gas burners.

FIG. 11 is a cross sectional view of the oven 100 taken through one of the gas burners 200. The location of the maintenance port 120 on a side (front side 112) is selected to be at the same or nearly the same elevation at which the burner screen 216 is located by virtue of the gas fired burner it is used with. For the oven as shown in FIG. 11, the maintenance port 120 provides access into the interior of the oven below the conveyor 122. The maintenance port 120 thus obviates, i.e., makes unnecessary, disassembly and removal of the conveyor 122 from the oven to access components, food or other objects that might fall through the conveyor 122.

Unlike prior art conveyor ovens that use forced hot air to cook food, or which use multiple zones in which, the emitted infrared is held constant or nearly constant, the conveyor oven 100 disclosed herein deliberately irradiates food or other objects on the conveyor using infrared energy provided by several infrared emitters that are located along the conveyor's pathway, the individual IR outputs of which are capable of being continuously varied. In a preferred embodiment, items on the conveyor 122 are irradiated from above and below the conveyor by locating IR emitters above the conveyor and below the conveyor. Items on the conveyor are thus "swept" with IR energy from multiple emitters, the emitted wavelength and intensity of which can be changed at each emitter. Stated yet another way, the infrared imparted to items on the conveyor changes almost continuously by its wavelength and preferably its intensity as well, all along the conveyor's path from one end of the oven (104 or 106) to the other (106 or 104).

Food items are cooked using infrared almost exclusively. Since air inside the oven is unavoidably heated, a small amount of heat energy is imparted to food items by air convection current. However, forced air is not used to heat items on the conveyor.

Using infrared to cook food provides several advantages over forced hot air.

Forced hot air tends to dry a food item more than will IR alone. In a conveyor oven having open ends, forced hot air cooking is also inherently less energy efficient because of the heat energy lost from the oven to its surroundings by virtue of the air being moved around inside the oven at high speed. Forced hot air ovens also tend to be noisy. Perhaps most importantly, subjective taste testing of foods cooked in a forced hot air oven versus foods cooked in a multi-zone conveyor described herein suggests that foods from the multi-zone conveyor oven described herein actually taste better. For preparing pizza, a multi-zone conveyor oven having infrared emitters in each zone approximates the heating process that takes place inside a brick oven. And, since the flame produced by the gas-fired burners 200 is not obstructed by a solid surface and instead open, oil droplets and particulates produced during the cooking of a first food product, and which fall downward onto the screen 216 are burned and therefore unable to settle onto a second food item and affect the taste of the food item. The oven disclosed herein thus produces a better-tasting product than does a prior art forced air oven. In the oven 100, the character of the infrared that irradiates items on the conveyor 122 changes almost continuously along the path that the conveyor 122 traverses by the use of multiple infrared emitters that are along the conveyor's path. Both the wavelengths and the intensity can be changed from one emitter to the next. More particularly, the spectrum of infrared wavelengths that are imparted to an object at the inlet of the oven 100 on the left side 104, is qualitatively different from the spectrum of infrared wavelengths imparted to an object at the outlet end of the oven on the right side 106. The intensity of the emitted IR along the conveyor's pathway can also be quantitatively changed.

As an item on the conveyor 122 passes through the oven from the inlet 104 to the outlet 106, the distinctly different spectra of infrared provided to items along the way, qualitatively change how the item is heated or cooked. For food items, changing the IR wavelengths as well as the IR intensity along the conveyor's path effectuates cooking that is faster, more thorough and which more importantly produces a better tasting result than is possible using prior art conventional, fixed-wavelength, fixed-intensity IR emitters along the conveyor's path forced hot air or constant-wavelength or constant-intensity IR emitters in even adjacent zones.

It is well-known that all forms matter emit infrared radiation. When the radiant energy, which is in the form of electromagnetic waves, falls on a body which is not transparent to them, such as a pizza, the waves are absorbed and then energy is converted into heat. It is also well-known that such radiation encompasses a range of wavelengths. The magnitude or intensity of the emitted radiation varies with wavelength. The term "spectral" is often used to refer to the nature of the magnitude/wavelength dependence.

Infrared radiation is perhaps best understood by reference to the radiation of a "blackbody." The term "blackbody" refers to an ideal infrared absorber and an ideal infrared emitter. Radiation processes including blackbody radiation is described in pages 723-809 of Incropera et al. The content of pages 723-809 of Incropera et al. is incorporated herein by reference in its entirety.

According to Incropera et al., a blackbody is a theoretical body that absorbs all incident radiation regardless of its wavelength and direction. For a prescribed temperature and wavelength, no surface can emit more energy than a blackbody. Blackbody radiation and the temperature dependence of its emitted infrared wavelengths provide understanding of the oven 100 described herein.

Incropera et al., states that blackbody spectral intensity can be determined from the equation inset below, which is referred to herein as Equation 1.

$$I_{\lambda,b}(\lambda, T) = \frac{2hc_0^2}{\lambda^5 [\exp^{(hc_0/\lambda kT)} - 1]} \quad \text{(Eq. 1)}$$

where h is Plank's constant, i.e., $6.266 \times 10^{-34}$ J·s, and where k is Boltzmann's constant, i.e., $1.381 \times 10^{-23}$ J/K and $c_0$ is the speed of light in a vacuum, $2.998 \times 10^8$ m/s. T is the absolute temperature of the blackbody in degrees Kelvin.

Incropera et al. also states that the spectral emissive power of a blackbody is represented or can be determined from Equation 2 below.

$$E_{\lambda,b}(\lambda, T) = \pi I_{\lambda,b}(\lambda, T) = \frac{C_1}{\lambda^5 [\exp(C_2/\lambda T) - 1]} \quad \text{(Eq. 2)}$$

Figure 3A:
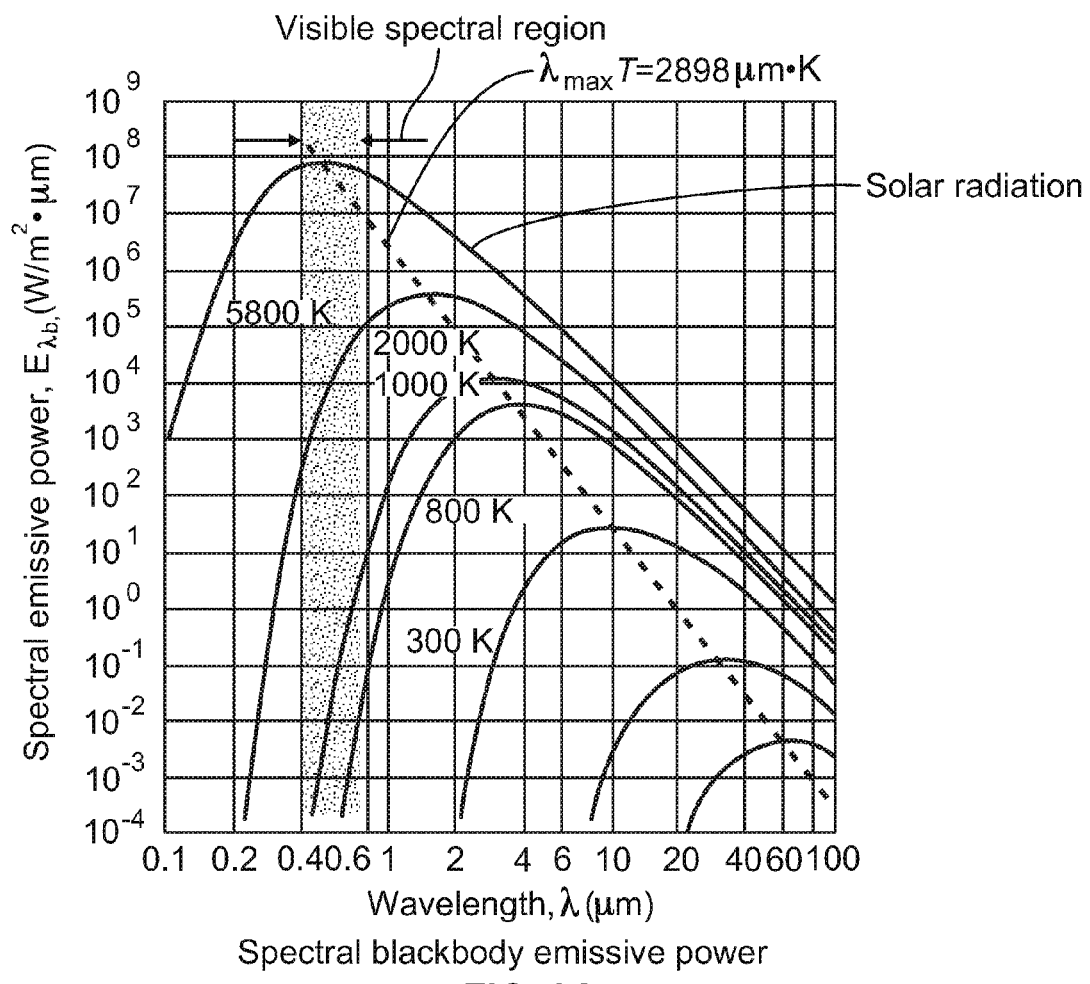
FIG. 3A contains plots of blackbody radiation intensity as a function of wavelength for different temperatures.

Equation 2, inset above is plotted in FIG. 3A for various selected temperatures. FIG. 3A shows that the spectral emissive power of IR energy emitted from a surface will vary continuously with wavelength. FIG. 3A also shows that at any given wavelength, the magnitude of the emitted radiation increases with increasing temperature. A spectral region nevertheless exists in which the emitted infrared radiation is concentrated and that spectral region depends on temperature with comparatively more radiation being emitted at shorter wavelengths as temperature increases. Perhaps most importantly, FIG. 3A and Equation 2 show that blackbody spectral radiation distribution has a maximum, i.e., a wavelength whereat the emitted radiation will be greatest. As stated in Incropera et al., the wavelength of the maximum, $\lambda_{max}$ can be determined by differentiating Equation 2 above with respect to $\lambda$ and setting the result equal to zero, the result of which is Equation 3, inset below.

$$\lambda_{max}T = C_3 \quad \text{(Eq. 3)}$$

where $C_3 = 2898$ μm·K.

According to Incropera et al., Equation 3 is known as Wien's displacement law. The locus of points described by Wien's displacement law is plotted as the dashed line in FIG. 3A. That dashed line shows that for a blackbody radiator, $\lambda_{max}$ is dependent on the blackbody's temperature. It also shows that the maximum spectral power increases with increasing temperature of a blackbody radiator. According to Incroperat et al., the total emissive power of a blackbody radiator, $E_b$ in all directions over all wavelengths is dependent on the blackbody temperature and can be calculated from the Stefan-Boltzmann law, expressed as $$E_b = \sigma T^4 \quad \text{(Eq. 4)}$$

where $\sigma$ is the Stefan-Boltzmann constant, which is $5.670 \times 10^{-8}$ W/m$^2$·K$^4$ Equations 3 and 4 show that for a blackbody radiator, the amount of infrared radiation and the emitted infrared wavelength maxima are both dependent on temperature. Stated another way, the amount of radiation emitted from a blackbody and the wavelengths of infrared bands on either side of $\lambda_{max}$ can be controlled and changed by controlling and changing the temperature of the blackbody.

Figure 3B:
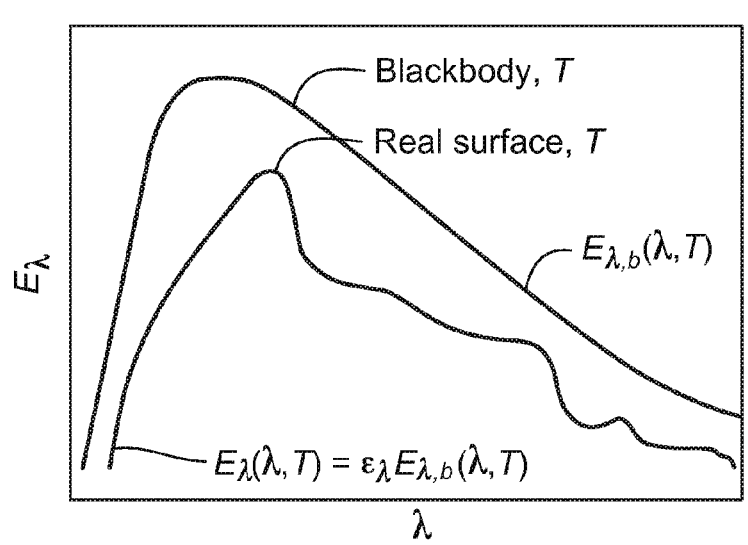
FIG. 3B is an illustration of how infrared radiation from a real surface might or could differ from blackbody radiation.

FIG. 3B illustrates how the infrared emitted from a real surface might vary from the infrared emitted from a blackbody. While no real surface has the properties of a blackbody, blackbody radiation is nevertheless useful to understanding operation of infrared emitters along the pathway of the conveyor 122 because blackbody radiation approximates how the spectra of infrared emitted from surfaces, such as the aforementioned wire mesh burner screen, can be controlled and changed along the conveyor's path.

In the oven 100, infrared emitters are configured and controlled to generate different spectral distributions of infrared energy along the length of the conveyor's path. They can also be controlled to generate different intensities for each different spectral distribution. For each infrared emitter in the oven 100, the spectral distributions of infrared wavelengths that include a $\lambda_{max}$ for each emitter and which are on either side of the $\lambda_{max}$ for each emitter, are referred to herein as "infrared profiles" or even more simply as "profiles."

During the time when a gas supply for the burner 200 is turned on and gaseous fuel is burning, products of combustion heat the wire screen 216. The gas valve for a burner is thus kept on (or open) until the wire screen 216 is heated to a temperature at which the screen emits a desired infrared energy profile for where the burner is located along the conveyor's path. That temperature will depend on the nature of the infrared energy required to process an item at a particular location or region along the conveyor's path.

By way of example, the infrared required to process a semiconductor wafer will be different that the infrared used to cook pizza. For cooking food items, suitable infrared wavelengths are considered herein to be all wavelengths between about 0.4 μm., which include most of the visible spectral region as well as longer, invisible wavelengths up to about 4, 6, 8 or even 10 μm. When a cold pizza is placed onto the conveyor at the inlet, experimentation shows that the pizza should be subjected to relatively short wavelengths at relatively high intensity levels in order to quickly heat the outside surface of the pizza and provide heat energy to a relatively shallow depth. As the pizza progresses through the oven, the pizza is irradiated with progressively longer wavelengths, which tend to heat correspondingly deeper portions of the pizza's interior.

Infrared wavelengths in the visible spectrum are considered by those of ordinary skill in the food processing art to be less penetrating than relatively longer wavelengths of about four to six micrometers (μm.). Longer wavelengths are considered to be more deeply penetrating.

Shallow penetration short wavelength IR is useful to "brown" or toast the exterior surfaces of foods. Long wavelengths provide heat into the interior of a food product, and are thus able to cook a food from the inside outwardly.

During the time that a pizza is in the first zone, the infrared emitters are not irradiating the pizza with substantially the same, relatively short wavelength IR nor are they irradiating the pizza with a substantially constant intensity level. The infrared emitters in each zone output IR energy that is almost continuously changing in wavelength and almost continuously changing in intensity level, with an average output wavelength and intensity level being centered at and determined by upper and lower temperatures to which the burners are heated and cooled, respectively.

In a preferred embodiment of the oven 100, foods are cooked or other items processed by placing them onto the conveyor 122 at an opening at an input end 104 of the oven 100. As a food product or other item moves into the oven 100, it enters a first region or area wherein infrared emitters located above and/or below the conveyor transmit toward the conveyor a first spectrum or profile of infrared energy. A heating (or cooking) zone is thus considered to be a portion of the conveyor's travel in which items on the conveyor 122 are subjected to infrared radiation having one and the same characteristic profile.

As the conveyor 122 continues moving the item through the oven 100, the item eventually passes into a second heating zone wherein the food product or item is irradiated using a second spectrum or profile of emitted infrared energy that is different from the first spectrum or profile.

In a preferred embodiment of the oven, the conveyor also passes through a third heating zone after they pass through the second heating zone. The third heating zone is considered to be the portion of the conveyor's travel wherein the food product or item is irradiated using a third spectrum or profile of emitted infrared energy that is at least qualitatively different from the second spectrum or profile, i.e., having a different $\lambda_{max}$. A third spectrum profile can also be the same as the first spectrum profile. In a preferred embodiment using gas-fired burners for infrared emitters, the profiles are effectuated by controlling the gas supply "on" time and "off" time.

FIGS. 4A-4D show how the "on" time and the "off" time of a gas valve for a gas-fired burner depicted in FIG. 2, determines the various different spectra and intensity of the infrared emitted from the wire mesh burner screens of several adjacent gas-fired burners 200.

Figure 4A:
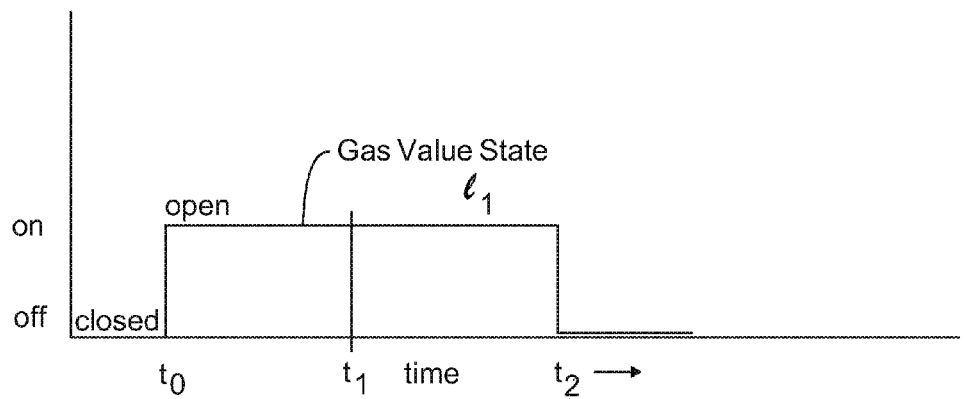
FIGS. 4A-4D show how gas valve on and off time effectuate infrared radiation wavelength profile and intensity.
Figure 4B:
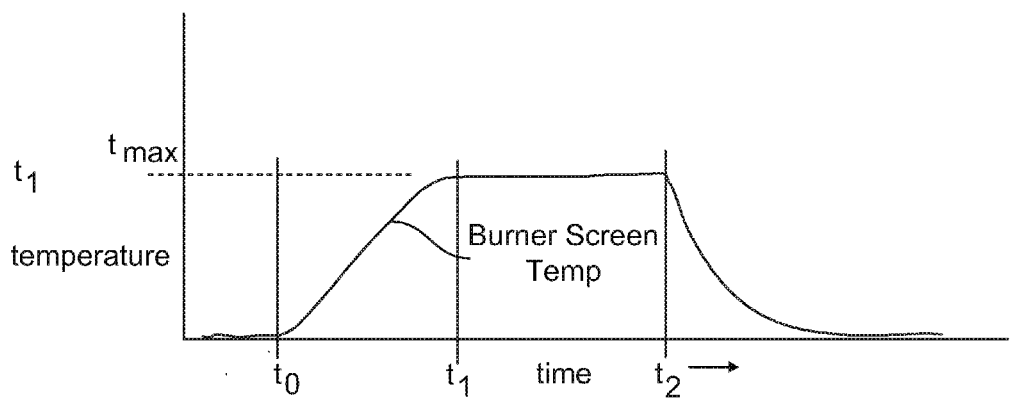

With regard to FIG. 4A, when the gas valve turns on at $t_0$ fuel combustion causes the burner screen temperature to increase as shown in FIG. 4B. As combustion continues, the burner screen temperature will, if desired, reach a steady state maximum value at a later time $t_1$. The maximum temperature of the screen 216 is identified in FIG. 4B as $t_{max}$, but its value is unspecified because the value of $t_{max}$ will be determined by the temperature of the combusting fuel.

In FIG. 4B, the horizontal or x axis corresponds to a lower, minimum screen temperature or $t_{min}$. The values of $t_{max}$ and $t_{min}$ and the difference between them are controllable by the gas valve on/off time.

As the burner screen temperature rises at $t_0$, the power of the emitted infrared, $E_b$, increases at the same time. As described above, all emitted wavelengths are produced, including the $\lambda_{max}$ emitted from the burner screen, which is plotted in FIG. 4C. As described above, $\lambda_{max}$ is the infrared wavelength at which the spectral radiation distribution for the burner screen temperature is a maximum, i.e., a wavelength whereat the emitted radiation for the burner screen is greatest. $\lambda_{max}$ thus depends on the screen temperature.

Figure 4C:
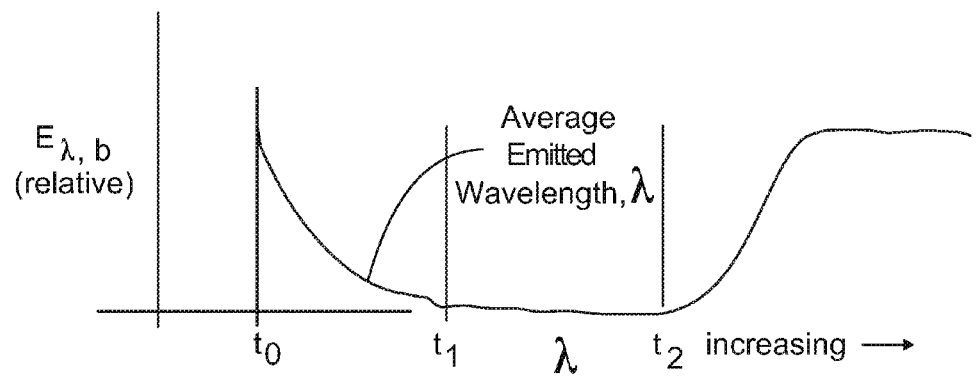
Figure 4D:
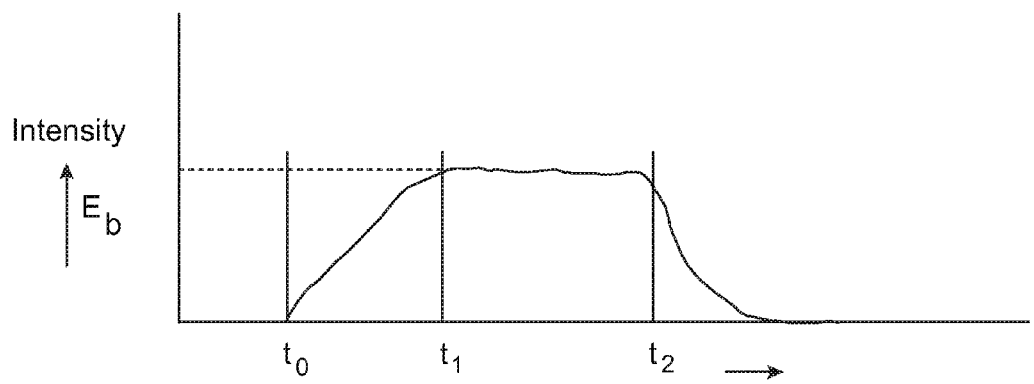

When the gas supply is shut off at $t_2$ as shown in FIG. 4A, the burner screen temperature will begin to decrease almost immediately as shown in FIG. 4B. All infrared wavelengths emitted from the burner screen will start to increase, i.e., get longer, including the $\lambda_{max}$ described above. The intensity $E_b$ of the infrared emitted from the burner screen will decrease from a maximum $E_b$ and eventually stabilize as shown in FIG. 4D.

When the gas is shut off after some period of time denoted in FIG. 4A as $t_2$, the burner screen temperature will begin to decrease as shown in FIG. 4B. As the burner screen temperature drops, the $\lambda_{max}$ of the spectra of infrared emitted from the burner screen will begin to lengthen as shown in FIG. 4C, which is a plot of the $\lambda_{max}$ emitted from the screen 216 as a function of time. The intensity $E_b$ of the infrared emitted from the burner screen will also decrease as shown in FIG. 4D.

Figure 4E:
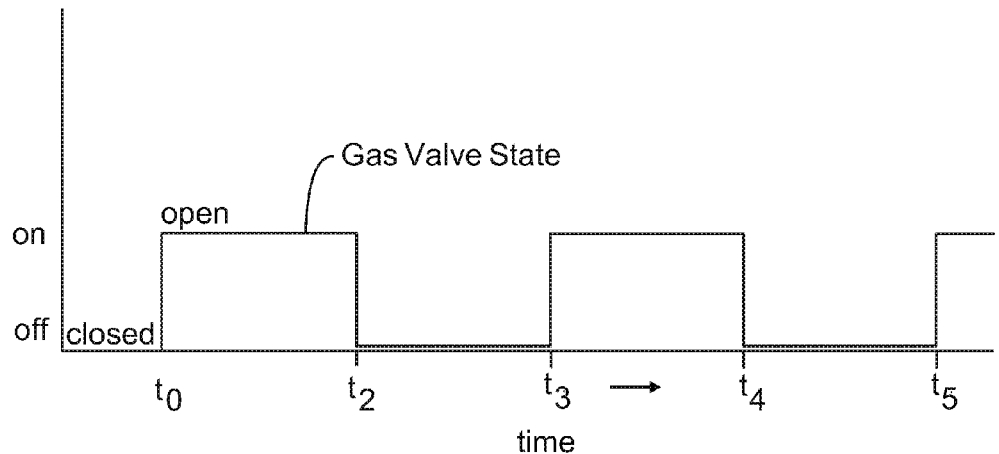
FIGS. 4E-4H show how gas valve on and off time can effectuate a different infrared radiation profile and intensity from the same infrared-emitting screen.
Figure 4F:
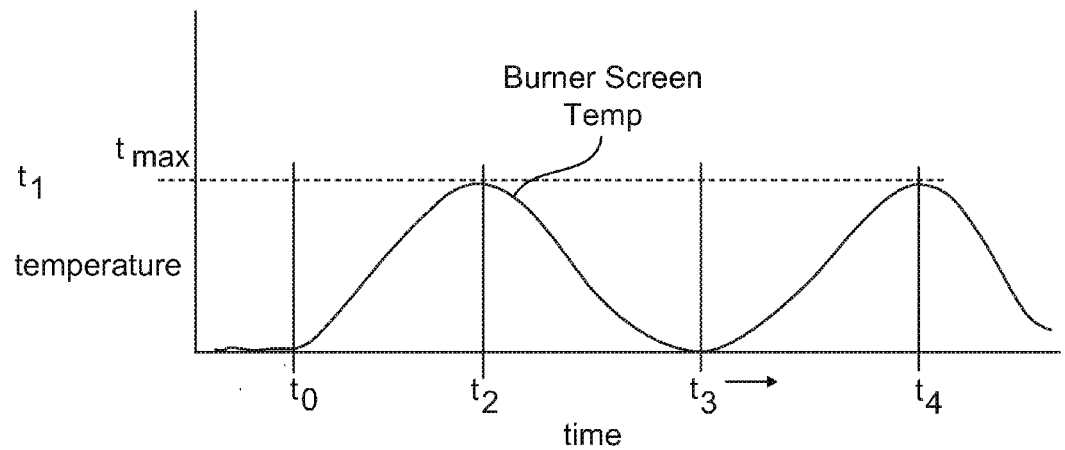
Figure 4G:
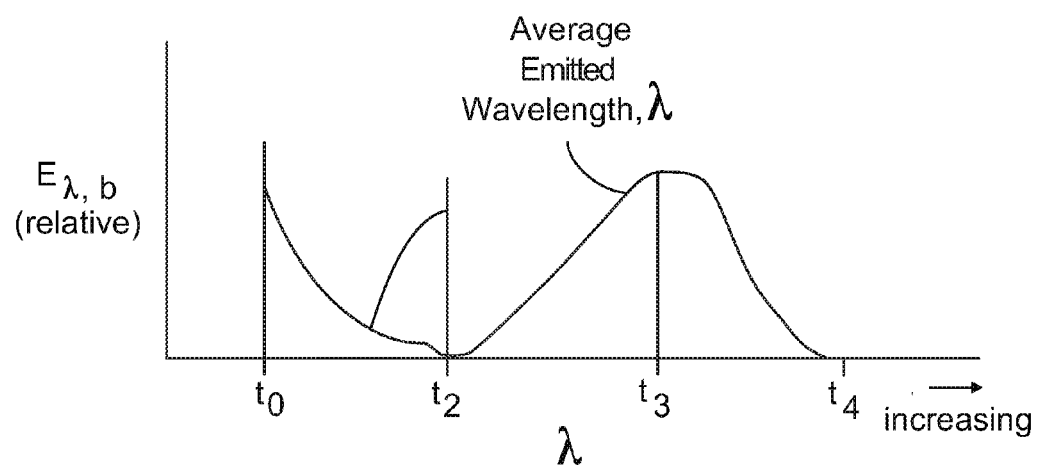
Figure 4H:
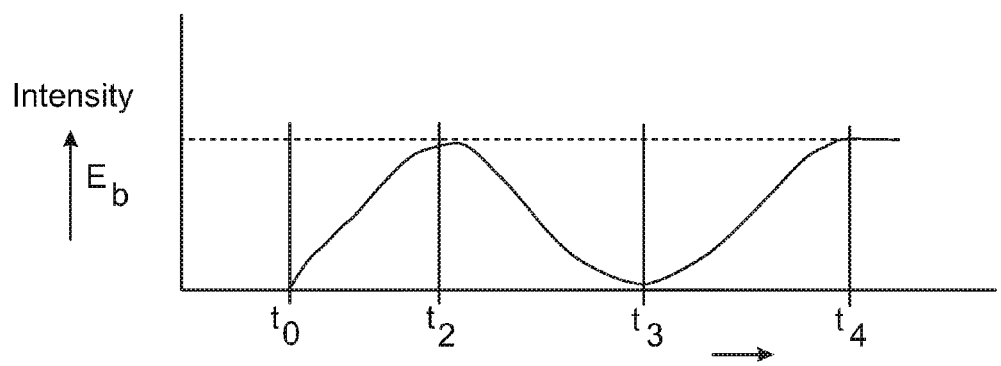

FIGS. 4E-4H show how changing the "on" time and the "off" time duty cycle and frequency of the same gas valve for the same burner can change the spectra of infrared emitted from it. FIGS. 4E and 4F show that by changing the gas valve on/off time, the burner screen temperature can be made to vary between two limits over time. FIG. 4F shows that the screen temperature's change as a function of time can be made sinusoidal or essentially sinusoidal. FIG. 4G and FIG. 4H show that the average emitted wavelength from the screen and intensity will also vary sinusoidally.

The equations inset above and FIGS. 4A through 4H show that the screen 216 temperature high and low values can be controlled via the gas valve on/off time to control the upper and lower values or bounds of the screen temperature. Controlling the temperature as shown thus controls the short and long wavelength limits as well as the corresponding wavelengths of $\lambda_{max}$ as the temperature changes.

Changing the "on" time and changing the "off" time of a gas supply thus varies $\lambda_{max}$ but also changes the spectrum or profile of the infrared wavelengths being generated. Changing the on time and off time also changes the emitted IR intensity. In other types of infrared emitters, such as electrically heated quartz IR emitters, changing the "on" time of an electrical power source and changing the "off" time will similarly change the profile of emitted infrared. The emitted IR thus "sweeps" an item of the conveyor 122 with a broader array of wavelengths and intensities than would otherwise be possible using a solid plate of any material.

Figure 5:
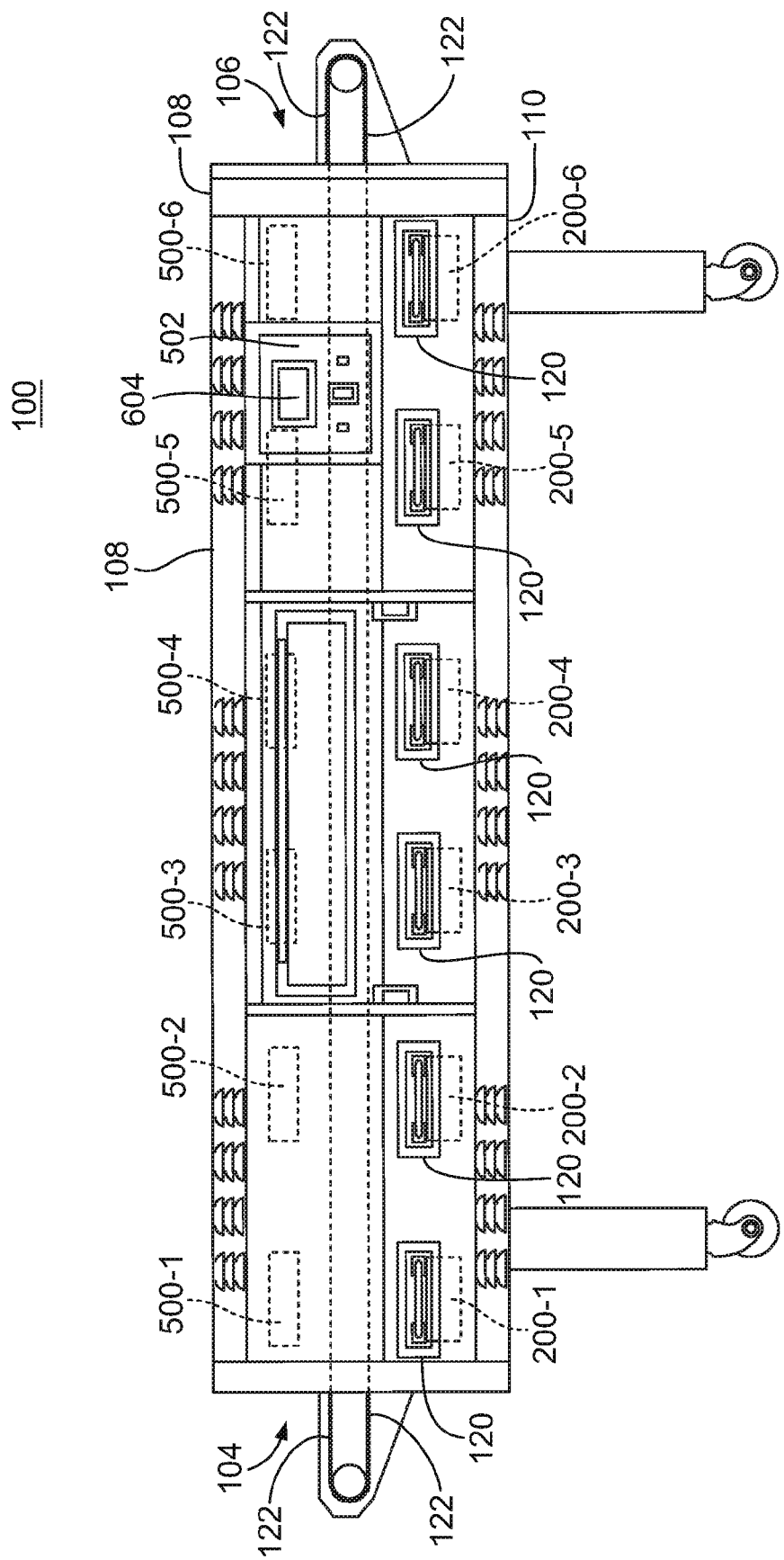
FIG. 5 is a front elevation view of the conveyor oven.

FIG. 5 is a front elevation view of the conveyor oven 100 shown in FIG. 1. The maintenance ports 120 described above are shown located into the front side 112 at an elevation that is below the lower portion of the conveyor 122 loop and at substantially the same level of the burner screen 216 for each of several gas-fired burners 200, which are drawn in FIG. 5 using broken/dashed lines. Electric infrared emitters 500 are located above the conveyor 122 and which emit infrared energy downwardly and toward the conveyor 122. The oven 100 is considered to be a "hybrid" oven because it uses both electrically powered infrared emitters 500 and gas-fired burners 200.

The front side of the oven 112 has a user interface panel 502 comprised of a display 604 and momentary push buttons by which a user can input commands to a computer, not shown in FIG. 5, which controls several gas valves. These valves control the supply of combustion gas to the gas burners 200. The same controller also controls electric energy provided to the electrically-powered infrared emitters 500.

Figure 6:
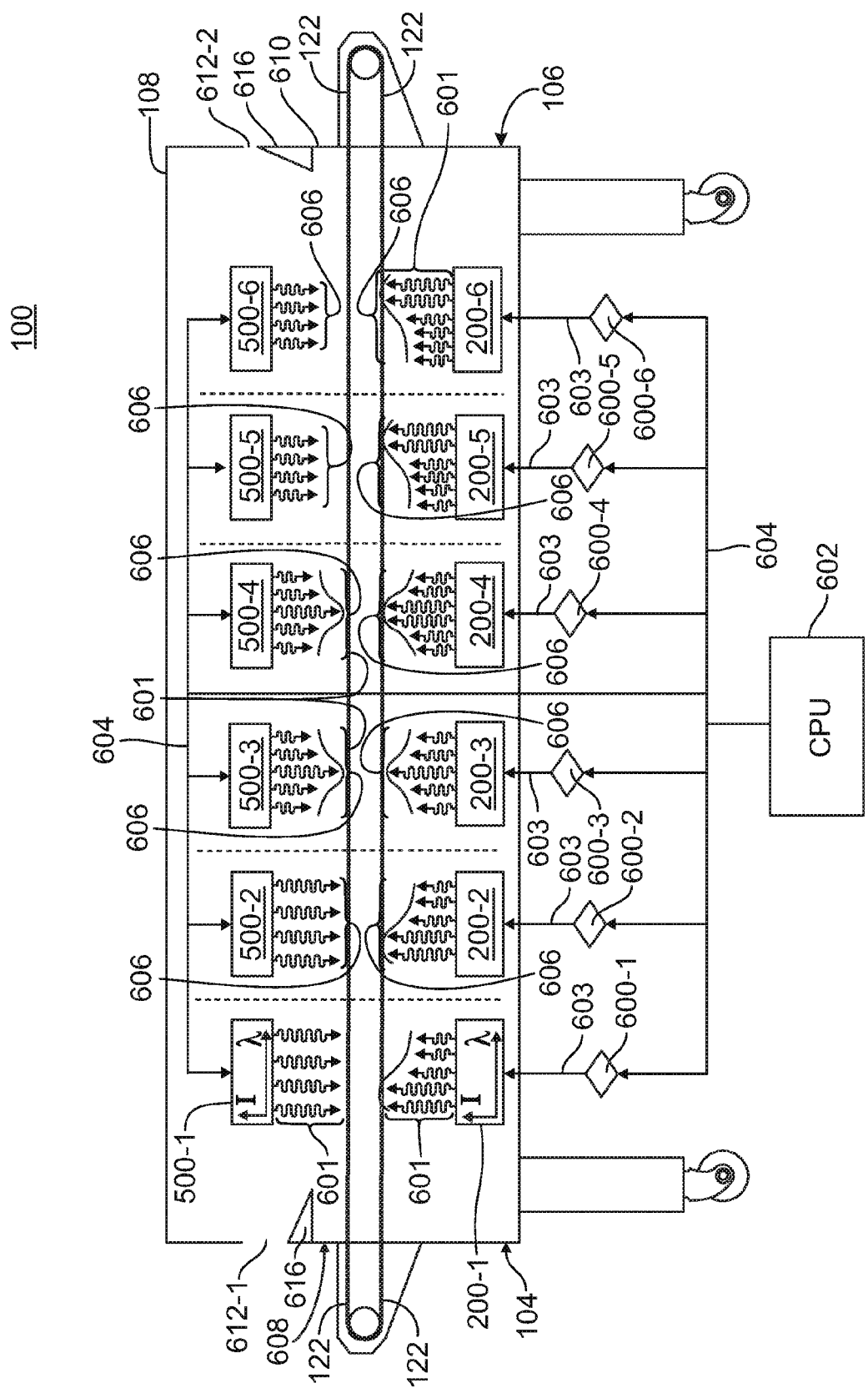
FIG. 6 is a cross-sectional view of the oven as shown in FIG. 5.

FIG. 6 is a cross-sectional view of the oven 100 schematically depicting several gas-fired burners 200 located side-by-side along the path that the conveyor 122 travels and which emit different infrared energy profiles 601. Gas valves 600 are coupled to a computer 602 that controls the supply of a gaseous fuel represented by the lines identified by reference numeral 603. The gas valves 600 are electrically controlled via wires or cables 604 that are connected to and which extend between the computer 602 and each valve 600. The computer 602 is controlled through the user interface 502 (shown in FIG. 5).

Six gas-fired burners 200 are denominated as 200-1 through 200-6. Six electrically-powered infrared emitters, each depicted as being directly above a corresponding gas-fired burner, are denominated as 500-1 through 500-6. Electrically-powered quartz infrared emitters are disclosed in U.S. Pat. No. 7,026,579, entitled Food Preparation Oven Having Quartz Heaters, which is assigned to the assignee of this application and incorporated herein by reference. Other infrared emitters heated by a light wave, such as a laser or by electromagnetic induction can also be used with the oven 100.

In a preferred embodiment of the oven 100, electrically-powered infrared emitters 500 are top-mounted, i.e., above the conveyor 122, and direct infrared energy downwardly toward the conveyor 122. The gas-fired burners 200-1 through 200-6 are bottom-mounted, i.e., below the conveyor 122, and direct infrared energy upwardly.

It is not necessary that the top-mounted infrared emitters, i.e., emitters above the conveyor 122, be located directly above a bottom-mounted emitter, i.e., one located below the conveyor 122. An alternate embodiment of the oven 100 includes top-mounted and bottom-mounted infrared emitters that are offset from each other, substantially as shown in U.S. Pat. No. 7,026,579.

Each of the infrared emitters is capable of emitting a different infrared energy profile by controlling the energy that is input to them. Stated another way, each of the infrared emitters, both gas and electric are capable of having an emitted infrared energy profile that is different from each other as well as different over time.

With regard to the gas-fired burners 200-1 through 200-6, the different emitted infrared energy profiles are represented in FIG. 6 by side-by-side, vertically-directed serpentine or boustrophedonic line segments 606 and the shapes or profiles of curved lines drawn above them. The different heights of the serpentine line segments and their locations along the top of each rectangle representing a burner 200 are shown as being varied to represent the relative weighting of emitted infrared intensity at different wavelengths. The first gas fired burner 200-1 is drawn with a Y-axis or ordinate inside the rectangle that represents the burner 200-1. The Y axis is labeled with an upper case Arabic letter i to indicate that the height of serpentine line segments indicate a comparative IR intensity level. The X-axis or abscissa is labeled with the Greek letter lamba ($\lambda$) to indicate the relative wavelength at which a corresponding emitted intensity emission occurs. The height of each serpentine line segment 606 and its location along the top of the burner 200 thus depict how the infrared energy output from one emitter 200 is weighted.

By way of example, gas-fired burner 200-1 is depicted with two, relatively long or tall serpentine lines 606 near the Y-axis to indicate that the intensity and wavelength of IR emitted from the first burner is heavily weighted in the short wavelengths and that those short wavelengths are more intense than longer wavelengths. Three serpentine lines 606 to the right of the longer serpentine lines are shorter and since they are farther down the X-axis, they indicate a correspondence to longer wavelengths. The serpentine lines 606 above the second burner 200-2 are the same as the serpentine lines above the first burner 200-1 but different from the serpentine lines 606 above the third burner 200-3, which indicate that the third burner 200-3 has its most intense IR weighted in the center of the range of possible wavelengths. The serpentine lines 606 above the fourth burner 200-4, the fifth burner 200-5 and the sixth burner 200-6 indicate the relatively intensity of emitted IR across the possible spectrum of IR.

The "profile" or shape of the heights of the serpentine line segments 606 above the first two burners 200-1 and 200-2 is different than the "profile" of the line segments 606 above the other burners. The serpentine lines 606 having a shape as shown in the first two burners 200-1 and 200-2 thus indicate qualitative and quantitative differences in the spectrum of infrared energy that is emitted from the first two burners as opposed to the spectra emitted from the other burners.

In the oven 100 and as shown in FIG. 6, the first two burners 200-1 and 200-2 have infrared profiles heavily weighted in the short wavelength spectrum rather than in the long wavelength spectrum. The third and fourth burners 200-3 and 200-4 have infrared profiles more heavily weighted in the middle infrared spectrum than in either short wavelength or long wavelength. Moreover, the fourth burner 200-4 has a greater emitted IR intensity than does the third burner 200-3 as depicted by the two long serpentine line segments 606 above the fourth burner 200-4 as compared to the single, long segment above the third burner 200-3.

In FIG. 6, the first two burners 200-1 and 200-2 define a first heating zone within the oven 100. The third burner 200-3 and fourth burner 200-4 can be considered to define a second heating zone, despite the fact that the weighting of emitted intensity of mid-wavelength IR from the fourth burner 200-4 is slightly greater than the mid-wavelength weighting of the IR from the third burner 200-3. As the contour lines above the boustrophedonic lines show, the shapes of the two profiles 601 from the third and fourth burners are similar.

The gas-fired burners identified by reference numerals 200-5 and 200-6 are drawn with relatively tall serpentine lines 601 located farther down the x-axis than those of the other burners. The taller lines 601 indicate that most of IR emitted from them is in the long wavelength portion of the IR spectrum than is the IR emitted from the first four burners. The fifth and sixth burners thus comprise a third heating zone.

The patterns of long, intermediate and short serpentine lines drawn above each gas-fired burner 200 represent a relative distribution of the infrared wavelengths emitted from each gas-fired burner 200. The first two gas-fired burners 200-1 and 200-2 are controlled by the gas valve on time and off time such that the emitted infrared energy spectrum is varying with each on/off cycle of the gas supply. The average of the emitted IR of the first two burners is more heavily weighted in the short wavelength region than the spectrum emitted from the fifth and sixth burners.

The preponderance of infrared energy in the short wavelength region in the first zone near the left end 104 as opposed to a long wavelength region near the right end 106 is effectuated by increasing the on-time of the gas valve 600-1 and 600-2 relative to its off time. The gas burners 200-1 and 200-2 are thus controlled by the computer 602 to have an emitted infrared spectrum profile that is more heavily weighted at the short wavelengths than at the long wavelengths.

With regard to the electrically-operated infrared emitters 500-1 through 500-6, each of them is also depicted as having a different emitted infrared profile 601. By way of example, the first two electrically-operated infrared emitters 500-1 and 500-2 are depicted as having a spectrum profile that is substantially uniform or substantially constant across an infrared spectrum, which is possible if the first two top-mounted infrared emitters 500-1 and 500-2 happen to be inductively-heated surfaces. The third and fourth electrically-operated infrared emitters 500-3 and 500-4 are depicted as having an emitted spectrum profile with the wavelengths in the center of the wavelength limits, more heavily weighted than those at either the long or short wavelength ends. The last two electrically-powered infrared emitters 500-5 and 500-6 are shown as having a uniform distribution of infrared wavelengths, the power level or intensity of which is also shown as much lower than those in the first two electrically-powered infrared emitters.

The oven 100 in FIG. 6 is considered herein as having several different heating zones, each zone being comprised of at least one infrared emitter that emits its own spectrum of infrared wavelengths. A first zone can be considered to be the first two gas-fired burners 200-1 and 200-2 in combination with the first two electrically-powered infrared emitters 500-1 and 500-2. The first two electrically-powered infrared emitters 500-1 and 500-2 have emitted infrared spectra that are substantially the same, i.e., relatively constant cross or between two wavelength limits. Similarly, the first two gas-fired burners 200-1 and 200-2 are depicted as having emitted infrared spectra that are substantially the same, i.e. a larger amount of short-wavelength infrared at higher intensity than they have at longer wavelengths.

A second heating zone can be considered to be the third and fourth gas-fired burners in combination with the third and fourth electrically-powered infrared emitters. All four of the infrared emitters in this second zone "B" are depicted as having emitted infrared spectra that are substantially the same. In other words, the infrared emitters concentrate their emitted infrared in the mid-wavelength region which is effectuated by controlling the gas valves 600-3 and 600-4 and the power to the electrically-powered emitters to keep the duty cycle at approximately 50%.

Finally, a third zone can be considered to be the fifth and sixth gas-fired burners in combination with the fifth and sixth electrically-powered burners.

Figure 7:
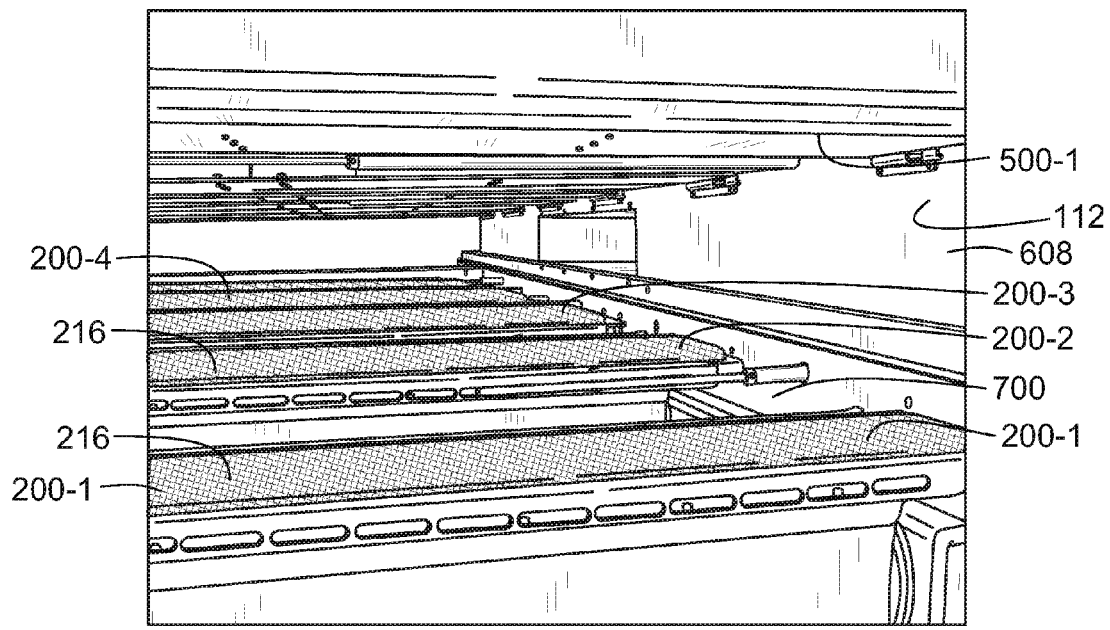
FIGS. 7 and 8 are depictions of the interior of the oven.

FIG. 7 is a depiction of the interior of the oven 100, looking into the oven 100 from the conveyor inlet port 608 in the left side 104 of the cabinet 102. The burner screens 216 are visible at the top of several gas-fired burners 200, which are arranged parallel to each other and laterally separated from each other by a horizontal separation distance or space 700. As described above with regard to FIG. 6, one or more of the infrared emitters can define a heating zone.

Figure 8:
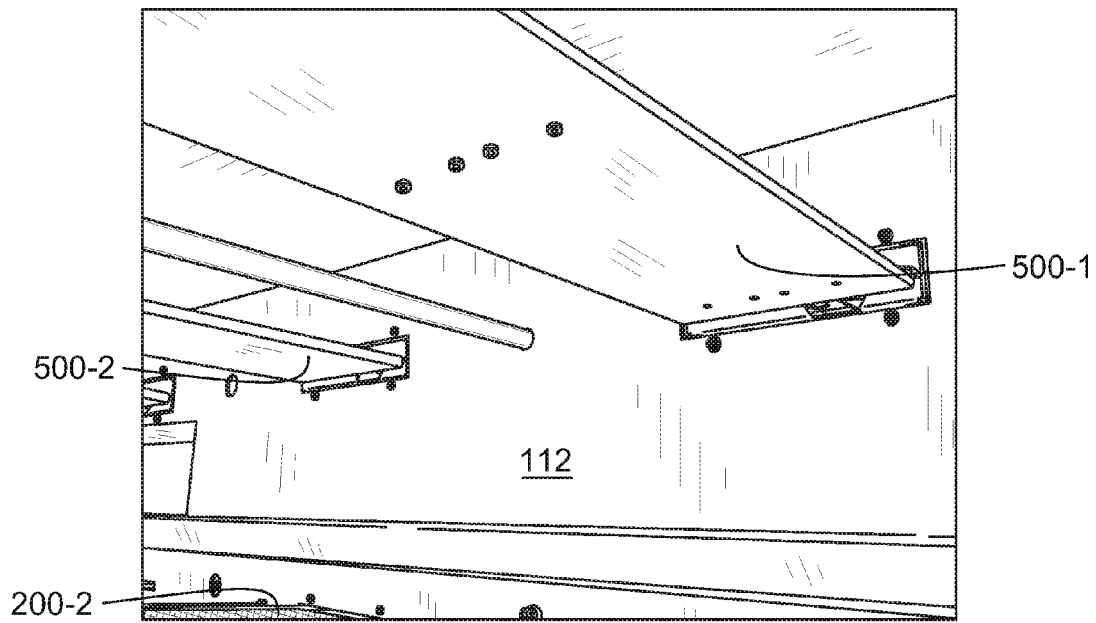

FIG. 7 and FIG. 8 show the relative location of the electrically-powered, top-mounted IR emitters 500 to be almost directly above corresponding gas-fired burners 200. In an alternate embodiment, the top-mounted IR emitters can be laterally offset relative to the gas burners.

In FIG. 7, a separation space 700 between the burners 200 provides a thermal break or separation between the burners. As an object passes over a burner 200 and then over a separation space 700, the infrared radiation received by an object on the conveyor 122 will thus also fluctuate due to an almost complete loss of IR when the object is over the separation space 700. In an alternate embodiment, the burners 200 can be abutted against each other, i.e., with no separation space such that the varying IR from the burners 200 varies virtually continuously from one end of the oven to the other.

By providing a plurality of separate heating zones, such as the ones shown in FIG. 6 and FIG. 7, a food product or other object placed on a conveyor 122 that extends from an inlet port 608 formed in the left-hand side 104 to an outlet port 610 in the right-hand side 106 is irradiated by different spectra of infrared wavelengths. Since each heating zone has a different spectrum of wavelengths, the cooking or thermally processing in each zone is correspondingly different. A food product on the conveyor 122 can thus be heated with high intensity, shallow-penetration depth short wavelength infrared in the first or second zones causing the exterior of the food product to be browned. As the conveyor 122 moves through the oven 100, the same food product can thereafter be irradiated in a second and/or third zone with somewhat longer wavelength IR that is correspondingly more deeply penetrating. The cooking or thermal processing can be concluded in a final zone using even longer wavelengths of less intense infrared energy.

A consequence of heating a wire mesh with a gas flame in order to generate infrared from the wire mesh is that the air inside the cabinet 102 is heated. Hot air will tend to collect inside the cabinet 102 and above the conveyor 122. Excess hot air above the conveyor can tend to bake items on the conveyor, i.e., heat them by convection rather than by infrared radiation. An interior temperature over about four hundred degrees F will also tend to degrade the cooking accomplished by the infrared. It is, therefore, desirable to keep the interior temperature of the oven 100 relatively cool in order to allow the infrared emitters to be operated optimally.

Temperature control of the oven 100 in order to maintain infrared emitter operation is accomplished by venting air from the oven 100. FIG. 6 shows a first vent 612-1 in the left end 104 of cabinet 102, the function of which is to control temperature inside the cabinet 102. A second vent 612-2 is provided in the right end 106 of the cabinet 102.

In FIG. 6, the size of the vent openings is determined by the orientation of a pyramid-shaped insert 616, the cross-sectional shape of which can be either a scalene or right-triangle. The insert 616 at the left-side opening is shown lying on its longest side. The insert 616 at the right-side opening is shown lying on its shortest side.

The areas of vents 612 in both left-hand end 104 and the right-hand end 106 of the cabinet and the amount of hot air they are able to release is made adjustable by a removable and rotatable metal prism 616 mounted on a shelf bracket 620 that extends outwardly from surfaces that define openings 608 and 610 in the ends 104 and 106 of the cabinet 102.

Unlike prior art ovens, which control temperature by cycling a heat source, air vents 612 control the amount of hot air leaving the oven 100 and thus effectuate temperature control inside the oven 100. Testing the oven 100 revealed that as temperature above the conveyor 122 and below the top 108 about 400° Fahrenheit interior surfaces of the cabinet 102 begin to act as infrared emitters, reradiating infrared energy. In order to be able to cook food or process other items on the conveyer using infrared, it is recommended to provide at least one air vent 612, proximate the top 108 of the cabinet 102 in order to purge hot air from the oven 100.

In the preferred embodiment, wherein the cabinet 102 is comprised of the aforementioned opposing front side 112 and rear side 114, the opposing left side 104 and right side 106, at least one hot air vent is preferably located in at least one of the ends 104 and 106 or in at least of the sides 112 and 114. In an alternate embodiment, a hot air vent can be located in the top 108. Another alternate embodiment, a thermostatically controlled damper can be employed in an opening which opens and closes responsive to the temperature inside the oven. In yet another embodiment, the computer 602 can control the position of the damper responsive to temperature sensors, such as those disclosed in one or more of the aforementioned patents incorporated herein by reference.

With regard to the aforementioned prism 616, a prism is defined as a solid figure whose bases or ends have the same size and shape and are parallel to one another, and each of whose sides is a parallelogram. In a preferred embodiment, the aforementioned prism 616 is a structure having two sides or ends that are right triangles having a short side, an orthogonal long side and a hypotenuse between them. In an alternate embodiment, the prism has a cross-sectional shape that is a scalene triangle, i.e., three sides of unequal length.

The prism 616 has parallelogram-shaped faces that extend between the edges of the two polygonal sides. Edges of the adjacent faces define edges of the prism. The size or area of the vents 612-1 and 612-2 is determined by the spacing or distance between an edge of the prism 616 and the top 620 of the openings 608 and 610 in the left side 104 and right side 106 respectively. The side of the openings 608 and 610 can thus be changed by resting the prism on the brackets, on different sides.

Figure 9:
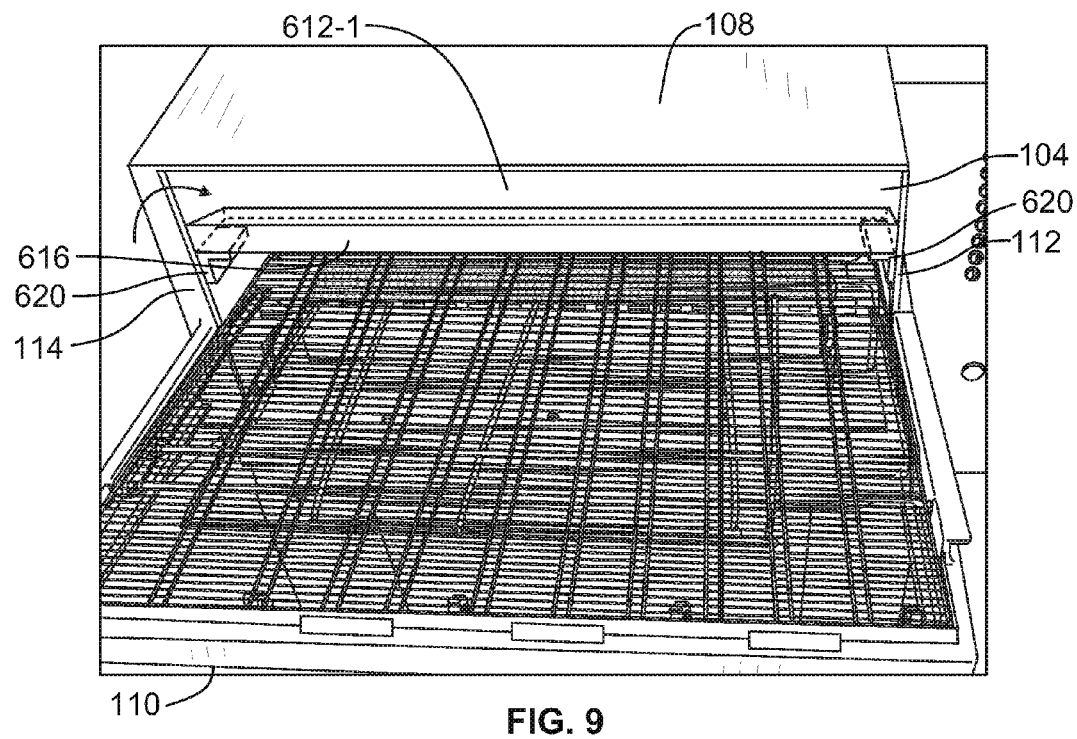
FIG. 9 is a view of the left end of the oven.
Figure 10:
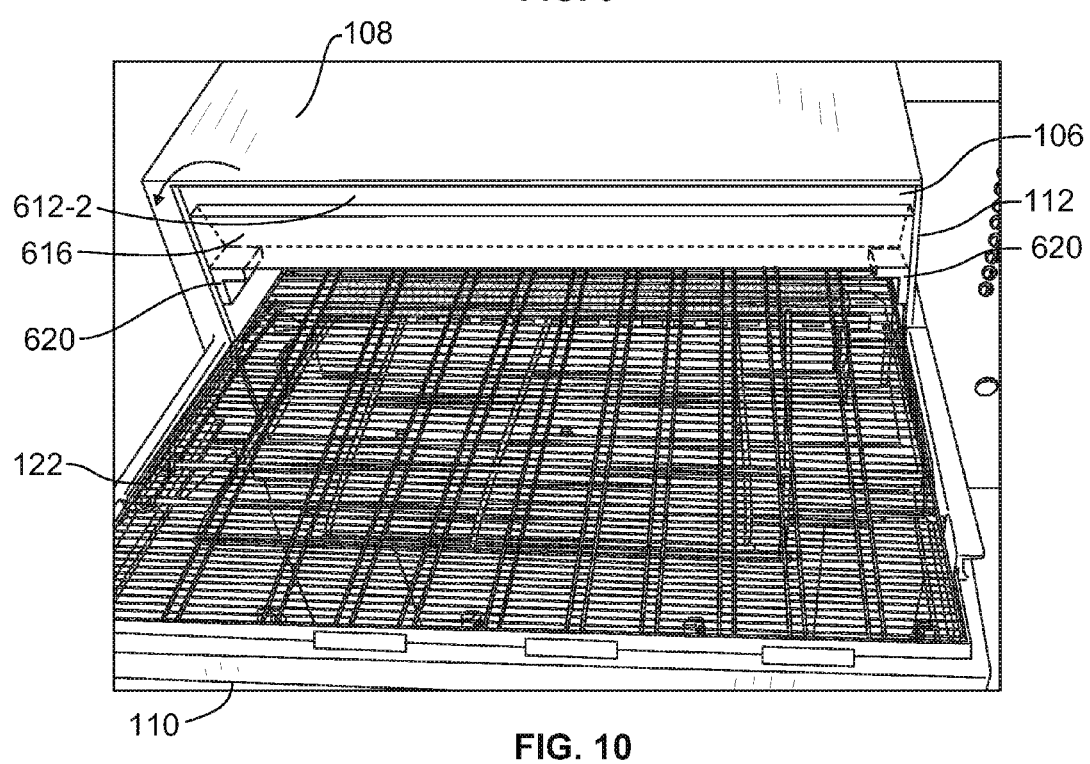
FIG. 10 is a view of the right end of the oven.

FIG. 9 is a view of the left-end or side 104 showing the prism 616 sitting atop a bracket 620 and rotated so that the longest side of the prism 616 faces the conveyor 122. FIG. 10 is a view of the right-end or side 106 showing the prism 616 sitting atop a bracket 620 and rotated so that the shortest side of the prism 616 faces the conveyor 122. In FIG. 9, the area of the vent 612-1 is much larger than is the area of the vent 612-2 shown in FIG. 10. Rotating the prism 616 so that it rests on different faces thus changes the opening of an air vent to allow more or less hot air to escape from the oven 100. Unlike prior art ovens that control temperature by controlling heat that is input to the oven, the oven depicted in the figures controls interior temperature by releasing heat from the oven. Temperature control is thus achieved by purging hot air.

In another particular alternate embodiment, the prism 616 can be replaced by a baffle having a shape substantially the same as a cylinder with an axis of symmetry down or located through the center of the cylinder. An axis of rotation which is parallel to but offset from the axis of symmetry and around which the cylinder rotates provides a substantially infinitely-variable baffle which when rotated around the axis of rotation in the openings and 610 provides an air gap 612 and that can be adjusted Those of ordinary skill in the art will recognize that the oven 100 described above is comprised of several different heating zones and that heating zones are defined by the infrared emitted profile of an infrared emitter. A zone can also be considered to be a portion or region of the path of the conveyor 122 wherein the infrared emitters output the same or at least substantially the same IR profile.

Those of ordinary skill in the art will recognize that since the gas-fired burners disclosed herein are capable of changing their emitted infrared profiles simply by changing the burner on time and off time, the burners can be used to provide an oven having a single zone but which has at least one infrared emitter configured to emit different spectra of infrared wavelengths at different times. Stated another way, each of the infrared emitters disclosed herein is capable of being controlled to emit different wavelength/intensity profiles and can therefore also be employed in a single zone oven. The oven can be operated to provide different spectra of infrared wavelengths at different times with the one infrared emitter transitioning from a first spectrum profile during a first time period to a second spectrum profile at a subsequent or later time period, the second spectrum profile being different from the first spectrum profile.

Figure 12:
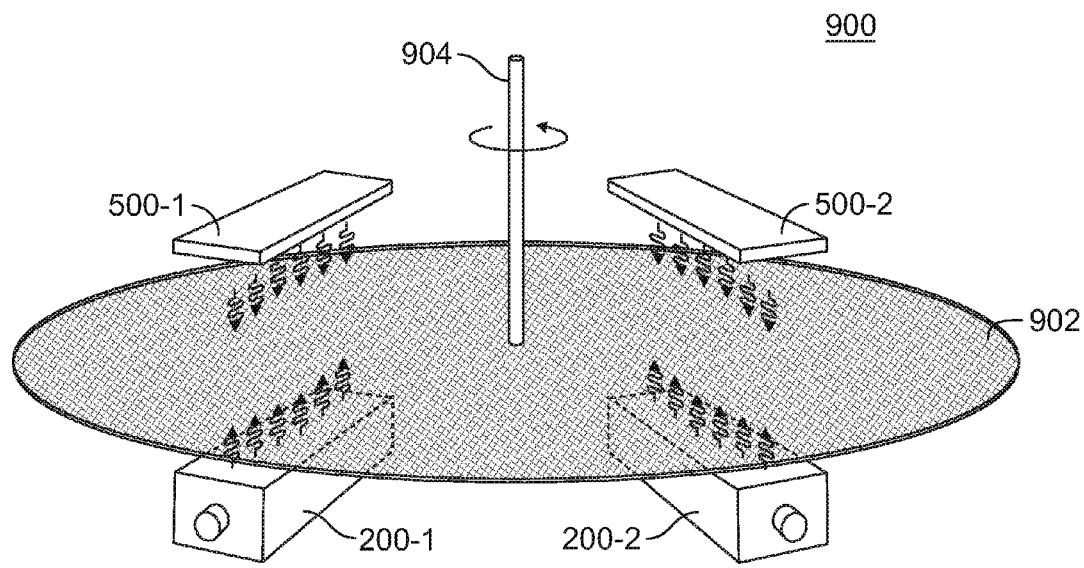
FIG. 12 is a perspective view of a second embodiment of an oven having a single heat zone.

FIG. 12 is a perspective view of a second embodiment of an oven 900 having two gas-fired infrared emitters 200-1 and 200-2 configured to direct infrared energy upwardly through a circular grill 902 constructed of a heavy gauge, rigid wire. The grill 902 rotates on a shaft 904. Electrically-powered infrared emitters 500-1 and 500-2 direct infrared energy downwardly, i.e., toward the grill 902. Not shown in FIG. 12 is a cabinet or housing in which the grill and emitters are enclosed.

The infrared emitters are configured as described above to be able to emit different IR profiles. When they are used in combination with a turntable, such as the rotating wire grill 902, they can provide an oven having one zone if all of the emitters are configured to output the same IR profile. By changing the operation of the burners as described above, the burners provide a different profile at a different time. The burners can thus provide a single-zone oven having multiple profiles at different times. They can also provide a multi-zone oven, the conveyor functionality of which is provided by a turntable.

Figure 13:
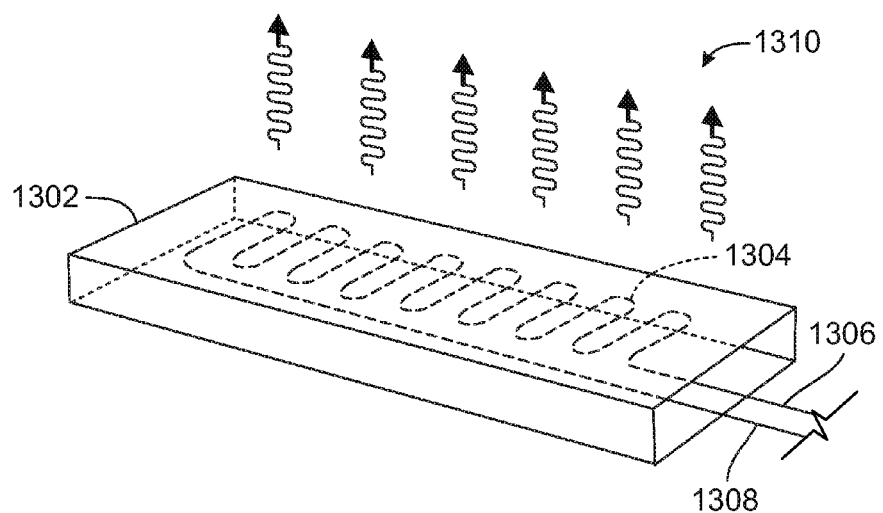
FIG. 13 is a perspective view of an electrically-powered infrared emitter.

FIG. 13 is a perspective view of an electrically-powered infrared emitting burner and which can be used in place of the gas-fired burner 200 depicted in FIG. 2. A box-shaped housing 1302, interior surfaces of which can be optionally provided with an IR-reflective coating. A thin, electrically-resistive filament 1304 having a serpentine or boustrophedonic shape is connected to an electrical current source through two ends 1306 and 1308. The windings of the filament 1304 are very thin and close to each other such that the filament defines a heating element having a thermal emissivity greater than a solid plate of the same material from which the filament is made. Infrared energy 1301 emitted from the electrically-powered IR emitter can thus be controlled to have profiles that are varied as the burner screen 216 shown in FIG. 2.

Nothing herein should be construed as a characterization or construction of any claim or claim limitation of any patent incorporated by reference. The foregoing description is for purposes of illustration only. The true scope of the invention is set forth in the appurtenant claims.

What is claimed is:
1. An oven comprising:
a cabinet having first and second opposing openings for a conveyor, the cabinet also having an interior space located between the first and second openings and having interior surfaces facing the interior space;
a conveyor extending between the first and second openings for a conveyor;
an infrared emitter;
an air vent in the cabinet, the air vent effectuating control of temperature inside the oven and control of temperatures of the interior surfaces;
wherein the air vent is configured to adjust infrared energy emitted from said interior surfaces responsive to the size of the air vent;
wherein the air vent is adjustable to control the amount of air leaving the oven thereby effectuating oven temperature adjustment; and
wherein the air vent comprises: a portion of an opening for a conveyor, which portion is also above the conveyor.

2. The oven of claim 1, wherein the infrared emitter is located in the cabinet above the conveyor and configured to direct infrared energy downwardly toward the conveyor.

3. The oven of claim 1, wherein the cabinet has a top and the air vent is proximate to the top.

4. The oven of claim 1, wherein the cabinet comprises: first and second fixed opposing sides, first and second fixed opposing ends comprising the first and second openings respectively, a top and a bottom.

5. The oven of claim 4, wherein the air vent is located in one of the first and second ends.

6. The oven of claim 3, wherein the air vent is located in the top.

7. The oven of claim 1, wherein the air vent is located in at least one of the first and second opposing sides.

8. The oven of claim 1, wherein the air vent comprises: an opening in the cabinet and a thermostatically controlled damper in the opening.

9. The oven of claim 1, wherein the air vent comprises: an opening in the cabinet and a computer controlled damper in the opening.

10. The conveyor oven of claim 1, wherein the air vent comprises: an opening in the cabinet and an adjustable baffle.

11. The conveyor oven of claim 1, wherein the air vent comprises: a baffle that partially closes said portion of the opening that is above the conveyor, the baffle being sized, shaped and arranged in said portion of the opening above the conveyor such that the air vent is located above the baffle and below the top of the cabinet, the baffle additionally reducing the size of the opening for a conveyor.

12. The conveyor oven of claim 11, wherein the baffle is a prism which comprises: two polygonal sides lying in substantially vertical and substantially parallel planes and a plurality of substantially parallelogram-shaped faces between the two polygonal sides, adjacent edges of the faces defining edges of the prism.

13. The conveyor oven of claim 12, wherein the two polygonal sides have shapes which are substantially a right triangle.

14. The conveyor oven of claim 12, wherein the two polygonal sides have shapes which are substantially a scalene triangle.

15. The conveyor oven of claim 10 wherein the baffle has a shape substantially the same as a cylinder having an axis of symmetry, the substantially cylinder-shaped baffle having an axis of rotation substantially parallel to and offset from said axis of symmetry around which the cylinder rotates, the substantially cylinder-shaped baffle capable of being rotated in said opening, rotation of the substantially cylinder-shaped baffle determining the size of the air vent.

* * * * *